United States Patent
Park et al.

(10) Patent No.: US 9,950,586 B2
(45) Date of Patent: Apr. 24, 2018

(54) DRIVING UNIT AND CLEANING ROBOT COMPRISING SAME

(71) Applicant: SAMSUNG ELECTRONICS CO., LTD., Suwon-si (KR)

(72) Inventors: Sung Jin Park, Suwon-si (KR); Jae Youl Jeong, Suwon-si (KR); Heum Yong Park, Suwon-si (KR); Dong Min Shin, Suwon-si (KR); Jeong Ki Yoo, Suwon-si (KR); Dong Hun Lee, Ansan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/125,776

(22) PCT Filed: Mar. 13, 2015

(86) PCT No.: PCT/KR2015/002447
§ 371 (c)(1),
(2) Date: Sep. 13, 2016

(87) PCT Pub. No.: WO2015/137764
PCT Pub. Date: Sep. 17, 2015

(65) Prior Publication Data
US 2017/0001490 A1 Jan. 5, 2017

(30) Foreign Application Priority Data
Mar. 13, 2014 (KR) .................. 10-2014-0029821

(51) Int. Cl.
*A47L 11/40* (2006.01)
*B60G 17/0165* (2006.01)
(Continued)

(52) U.S. Cl.
CPC ...... *B60G 17/0165* (2013.01); *A47L 11/4011* (2013.01); *A47L 11/4041* (2013.01);
(Continued)

(58) Field of Classification Search
CPC .................. A47L 11/00; A47L 11/40
See application file for complete search history.

(56) References Cited

U.S. PATENT DOCUMENTS 5,440,216 A 8/1995 Kim
9,775,476 B2 * 10/2017 Jang ................ A47L 9/009
(Continued)

FOREIGN PATENT DOCUMENTS

DE 20 2008 017 137 U1 4/2009
EP 1 806 210 A2 7/2007
(Continued)

OTHER PUBLICATIONS

International Search Report dated Jul. 6, 2015 in corresponding International Application No. PCT/KR2015/002447.
(Continued)

*Primary Examiner* — John D Walters
*Assistant Examiner* — James J Triggs
(74) *Attorney, Agent, or Firm* — Staas & Halsey LLP

(57) ABSTRACT

Disclosed herein is a cleaning robot including an improved driving unit to escape from an undriveable state occurring under various driving conditions. The cleaning robot includes a body, and a driving unit that drives the body. The driving unit includes a first driving motor and a second driving motor that generate driving power; a driving wheel that rotates when the driving power is delivered to the driving wheel from the first driving motor; and a wheel frame that supports the driving wheel to be rotatable and rotates between a first position and a second position with respect to a motor shaft of the first driving motor. The wheel frame rotates in at least one section between the first position and the second position when the driving power is delivered to the wheel frame from the second driving motor.

20 Claims, 36 Drawing Sheets

(51) Int. Cl.
   *B60G 17/015* (2006.01)
   *B60K 7/00* (2006.01)
   *B60K 17/14* (2006.01)

(52) U.S. Cl.
   CPC ....... *A47L 11/4066* (2013.01); *A47L 11/4072* (2013.01); *B60G 17/0157* (2013.01); *B60K 7/0007* (2013.01); *B60K 17/145* (2013.01); *A47L 2201/04* (2013.01)

(56) References Cited

U.S. PATENT DOCUMENTS

2013/0055521 A1 3/2013 Lee et al.
2013/0340201 A1 12/2013 Jang et al.

FOREIGN PATENT DOCUMENTS

| | | |
|---|---|---|
| EP | 2 679 130 A1 | 1/2014 |
| KR | 1992-0007560 | 10/1992 |
| KR | 10-2005-0063547 | 6/2005 |
| KR | 10-2013-0025310 | 3/2013 |
| KR | 10-2014-000811 | 1/2014 |

OTHER PUBLICATIONS

Australian Office Action dated Jun. 8, 2017, in corresponding Australian Patent Application No. 2015230141.
Extended European Search Report dated Nov. 24, 2017, in corresponding European Patent Application No. 15761755.6.
Australian Notice of Acceptance for Patent Application dated Sep. 22, 2017, in corresponding Australian Patent Application No. 2015230141.

* cited by examiner

DRIVING UNIT AND CLEANING ROBOT COMPRISING SAME

CROSS-REFERENCE TO RELATED APPLICATIONS

This application is a U.S. National Stage Application, which claims the benefit under 35 U.S.C. § 371 of PCT International Patent Application No. PCT/KR2015/002447, filed Mar. 13, 2015, which claims the foreign priority benefit under 35 U.S.C. § 119 of Korean Patent Application No. 10-2014-0029821, filed Mar. 13, 2014, the contents of which are incorporated herein by reference.

TECHNICAL FIELD

Embodiments of the present invention relate to a driving unit for driving a cleaning robot and a cleaning robot including the same.

BACKGROUND ART

In general, a cleaning robot is a device that automatically cleans a region to be cleaned by sucking foreign substances such as dust from a surface of the region while driving through the region without a user's manipulation.

In the cleaning robot, a pair of driving wheels are installed at both lower sides of a body to move the cleaning robot and at least one caster is installed to support the body so that the body of the cleaning robot may move forward/backward or rotate within a region to be cleaned.

DISCLOSURE

Technical Problem

In the region to be cleaned through which the cleaning robot drives, obstacles, such as a step, an object having an inclined surface, and furniture, may be present. A robot, such as a cleaning robot with a body having a low height, may be in an undriveable state (hereinafter referred to as a 'stuck state') when the cleaning robot enters a narrow gap under an obstacle (e.g., beneath a bed or a sofa) and thus an upper portion of the cleaning robot is caught in the narrow groove (hereinafter referred to as a 'caught state') or when the cleaning robot climbs onto an obstacle to cause the driving wheels of the cleaning robot to be lifted (hereinafter referred to as a 'lifted state').

Technical Solution

Therefore, it is an aspect of the present invention to provide a cleaning robot including an improved driving unit to escape from an undriveable state occurring under various driving conditions.

Additional aspects of the invention will be set forth in part in the description which follows and, in part, will be obvious from the description, or may be learned by practice of the invention.

In accordance with one aspect of the present invention, a cleaning robot includes a body, and a driving unit to drive the body. The driving unit includes a first driving motor and a second driving motor to generate driving power; a driving wheel to rotate when the driving power is delivered to the driving wheel from the first driving motor; and a wheel frame to support the driving wheel to be rotatable and rotate between a first position and a second position with respect to a motor shaft of the first driving motor. The wheel frame rotates in at least one section between the first position and the second position when the driving power is delivered to the wheel frame from the second driving motor.

The cleaning robot may further include a housing to fix the first driving motor and the second driving motor; and an elastic member disposed between the housing and the wheel frame. The wheel frame may be pressurized by the elastic member to rotate in a section in which the driving power is not delivered to the wheel frame from the second driving motor.

The wheel frame may be pressurized by the elastic member to rotate between the first position and a third position between the first position and the second position, and rotate between the third position and the second position when the driving power is delivered to the wheel frame from the second driving motor.

The driving unit may include at least one first power transfer gear contained in the wheel frame to deliver the driving power generated by the first driving motor to the driving wheel; and at least one second power transfer gear disposed between the second driving motor and the wheel frame to deliver the driving power generated by the second driving motor to the wheel frame.

The wheel frame may include at least one drive gear disposed on an external surface of the wheel frame to receive the driving power from the second power transfer gear.

The at least one drive gear may rotate on the motor shaft of the first driving motor.

The at least one drive gear and the second power transfer gear may not be engaged with each other when the wheel frame rotates between the first position and the third position.

The motor shaft of the first driving motor and a motor shaft of the second driving motor may be parallel to each other.

In accordance with another aspect of the present invention, a driving unit may include a driving wheel; a wheel frame to support the driving wheel to be rotatable; an elastic member to pressurize the wheel frame; a first driving motor to generate driving power for rotating the driving wheel; and a second driving motor to generate driving power for rotating the wheel frame.

The elastic member and the second driving motor may independently rotate the wheel frame.

The wheel frame may include a gear storage unit disposed in the wheel frame; and first power transfer gears contained in the gear storage unit to transfer the driving power generated by the first driving motor to the driving wheel.

The driving unit may further include second power transfer gears disposed between the second driving motor and the wheel frame to transfer the driving power generated by the second driving motor to the wheel frame.

The driving unit may further include a support frame to support the second power transfer gears to be rotatable.

The wheel frame may include a drive gear disposed on an external surface of the wheel frame to receive the driving power from the second power transfer gears.

The second power transfer gears may include a motor shaft gear engaged with a motor shaft of the second driving motor; a tilt gear disposed to be engaged with the drive gear; and at least one connection gear disposed between the motor shaft gear and the tilt gear, to transfer power.

The driving unit may further include a power transfer prevention unit disposed on a circumferential surface of one of the drive gear and the tilt gear to not transfer power between the drive gear and the tilt gear when the wheel frame is pressurized by the elastic member to rotate.

The drive gear may be integrally formed with the wheel frame.

The driving unit may further include a housing to support the first driving motor and the second driving motor.

The driving unit may further include a first rib protruding from an inner surface of the housing toward an inner side of the housing to support one end of the elastic member; a holder coupled to the wheel frame to be rotatable so as to support another end of the elastic member; and a second rib protruding from an external surface of the wheel frame to support the holder.

The wheel frame may include a guide hole to guide rotation of the wheel frame. The holder may include a rotation unit coupled to the guide hole to be rotatable; and a support unit protruding from the rotation unit in a direction of a radius of the rotation unit to support the other end of the elastic member.

The driving unit may further include a stopper formed on an inner surface of the housing to limit rotation of the holder.

The elastic member may pressurize the support unit in a direction of a tangent line of a trajectory formed by one end of the support unit.

The elastic member may be disposed at a position opposite the driving wheel with respect to a vertical line passing through a center of rotation of the wheel frame.

In accordance with another aspect of the present invention, a cleaning robot includes a body; a driving unit installed in the body to drive the body; and a controller to control the driving unit by determining a driving state of the body. The driving unit includes a driving wheel; a wheel frame to support the driving wheel to be rotatable; and a driving unit including a driving motor to generate driving power for rotating the wheel frame. When it is determined that the body is in a stuck state which prevents the body from driving, the controller drives the driving motor to rotate the wheel frame.

Advantageous Effects

As is apparent from the above description, in accordance with the one or more embodiments of the present invention, a cleaning robot is capable of escaping from an undriveable state caused by various driving conditions by controlling a length to which a driving wheel is moved downward.

DESCRIPTION OF DRAWINGS

These and/or other aspects of the invention will become apparent and more readily appreciated from the following description of the embodiments, taken in conjunction with the accompanying drawings of which.

MODES OF THE INVENTION

Figure 1:
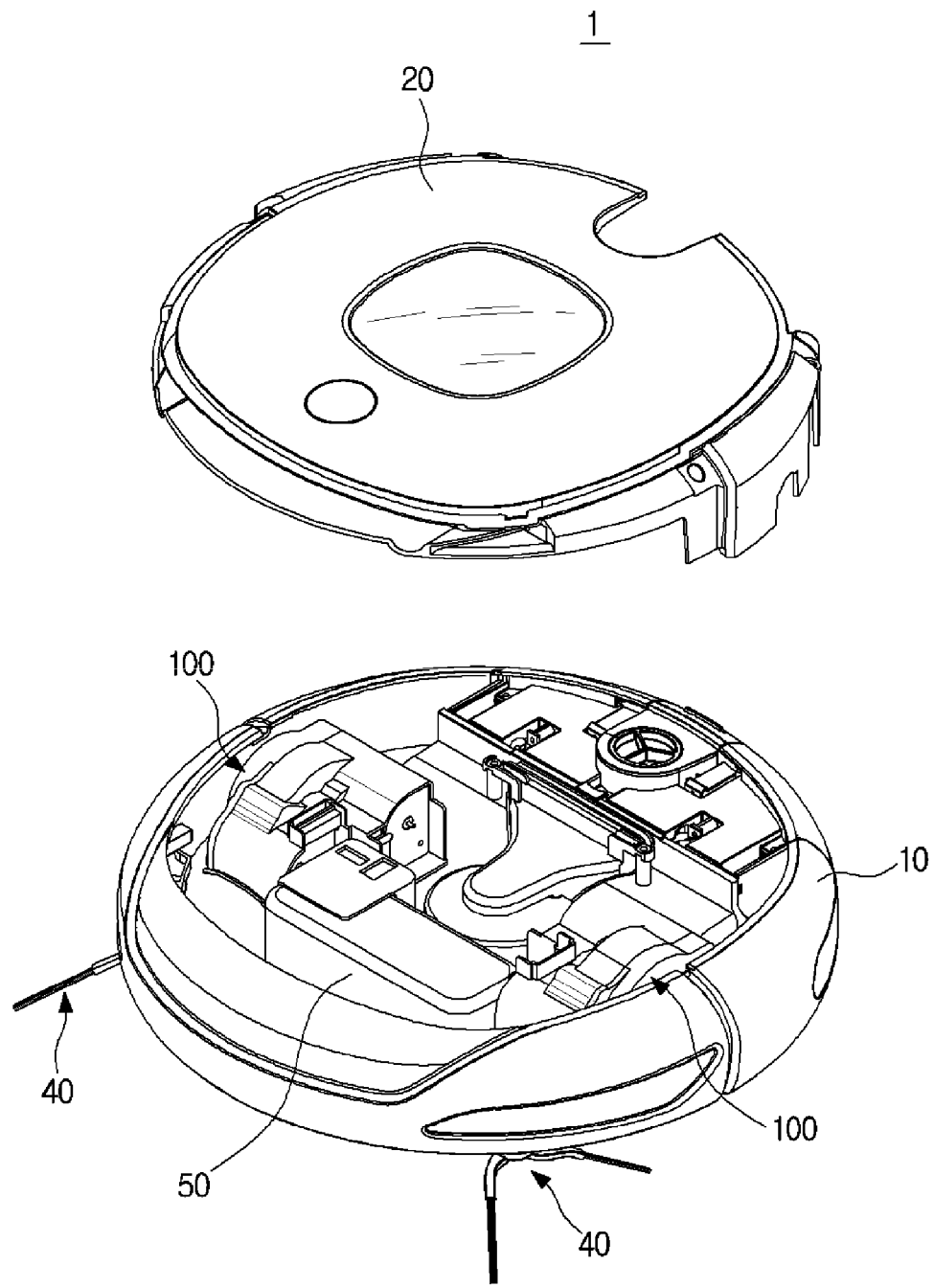
FIG. 1 is a diagram illustrating the structure of a cleaning robot in accordance with one embodiment of the present invention.

Reference will now be made in detail to the embodiments of the present invention, examples of which are illustrated in the accompanying drawings, wherein like reference numerals refer to like elements throughout.

Figure 2:
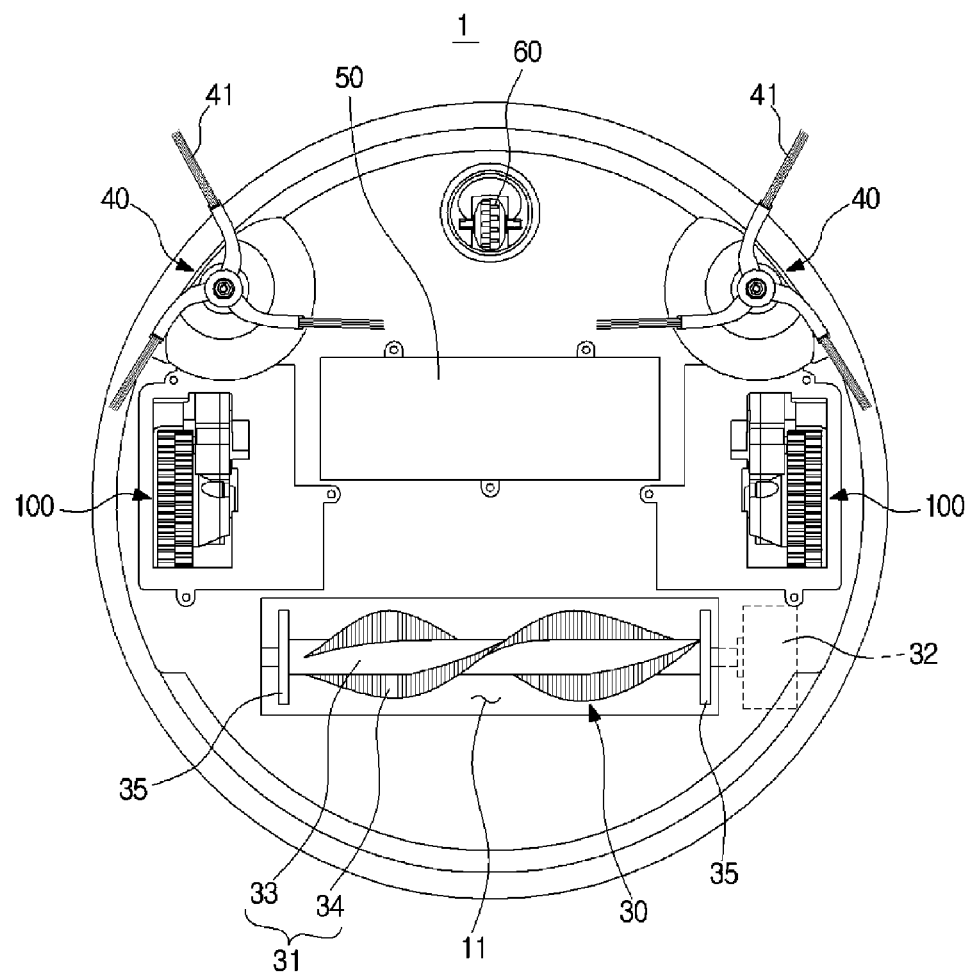
FIG. 2 is a bottom view of a cleaning robot in accordance with one embodiment of the present invention.

FIG. 1 is a diagram illustrating the structure of a cleaning robot 1 in accordance with one embodiment of the present invention. FIG. 2 is a bottom view of the cleaning robot 1 in accordance with one embodiment of the present invention Referring to FIGS. 1 and 2, the cleaning robot 1 includes a body 10 that forms the exterior of the cleaning robot 1, a cover 20 that covers an upper portion of the body 10, brush units 30 and 40 that sweep up or scatter dust in a space to be cleaned, a power source 50 that supplies driving power for driving the body 10, and driving units 100 for driving the body 10.

The body 10 not only forms the exterior of the cleaning robot 1 but also supports various components installed in the cleaning robot 1.

The brush units 30 and 40 include a main brush unit 30 that is installed at an intake port 11 at the bottom of the body 10 to improve the efficiency of taking in dust and that sweeps up or scatters dust at the bottom of the body 10, and side brush units 40 that are installed at both front lower portions of the body 10 to sweep up dust on a surface on which the cleaning robot 1 drives toward the intake port 11.

The main brush unit 30 includes a drum type brush unit 31 that has a length corresponding to the intake port 11, is installed at the intake port 11, and rotates with respect to the bottom surface so as to sweep up or scatter dust on the bottom surface, similar to a roller; and a brush motor 32 that rotates the brush unit 31.

The brush unit 31 includes a roller 33 and a brush 34. The roller 33 is formed of a rigid material, coupled to the body 10 to be rotatable, and driven by the brush motor 32. End caps 35 are installed at both ends of the roller 33 to prevent foreign substances from moving to the brush motor 32. The brush 34 is formed of an elastic material, placed in the roller 33, and is driven together with the roller 33 to whip dust or foreign substances accumulated on the bottom surface while the cleaning robot 1 drives.

The side brush units 40 each include one of brushes 41 that are installed at both sides of the front surface of the body 10 at predetermined intervals and that rotate horizontally with respect to the bottom surface to sweep up dust on the bottom surface, which cannot be swept by the main brush unit 30, toward the intake port 11.

The power source 50 includes a battery that is electrically connected to a first driving motor 150 and a second driving motor 160 (see FIG. 3) of each of the driving units 100, the brush motor 32 that rotates the main brush unit 30, and other driving units for driving the body 10 so as to supply driving power thereto. The battery is disposed as a rechargeable secondary battery, and is supplied power from a docking station (not shown) to be charged when the body 10 is coupled to the docking station after cleaning is completed.

A caster wheel 60 is installed at the front of the body 10 such that a rotation angle thereof varies according to the state of a bottom surface on which the cleaning robot 1 drives. The caster wheel 60 supports the cleaning robot 1 to stabilize the posture of the cleaning robot 1 and to prevent the cleaning robot 1 from dropping, and includes a roller or a caster type wheel.

Although an embodiment of the present invention has been described with respect to a case in which the caster wheel 60 is installed at the front of the body 10, embodiments of the present invention are not limited thereto. The same object and effects of the present invention can be achieved even when the caster wheel 60 may be installed at the rear of or both of the front and rear of the body 10.

The driving units 100 are disposed at both sides of a central portion of the body 10, respectively, to allow the body 10 to move forward, backward or rotatably during a cleaning process.

The driving units 100 may rotate in a forward or backward direction according to a command from a controller 220 (see FIG. 8), which will be described below, to move the cleaning robot 1 forward or backward or to rotate the cleaning robot 1. For example, the driving units 100 may rotate in the forward or backward direction to move the cleaning robot 1 forward or backward. Also, the cleaning robot 1 rotates in a counterclockwise direction at the front thereof by rotating the right driving unit 100 in the forward direction while the left driving unit 100 rotates in the backward direction, and rotates in a clockwise direction in front thereof by rotating the left driving unit 100 in the forward direction while the right driving unit 100 rotates in the backward direction.

Embodiments of the present invention will now be described with respect to the driving unit 100 located to the right of a direction in which the body 10 moves forward. The following description also applies to the driving unit 100 located to the left of the direction in which the body 10 moves forward unless specified otherwise.

Figure 3:
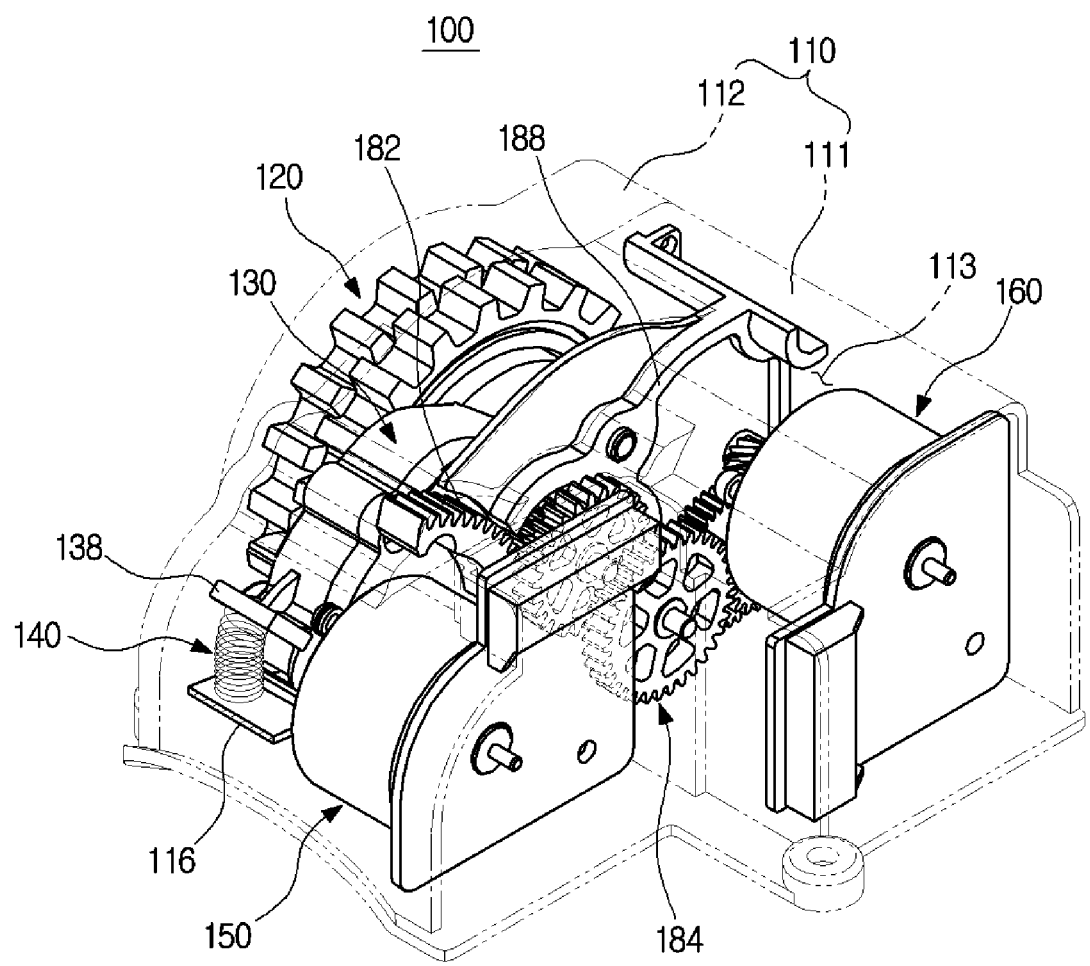
FIG. 3 is a perspective view of a driving unit in accordance with one embodiment of the present invention.
Figure 4:
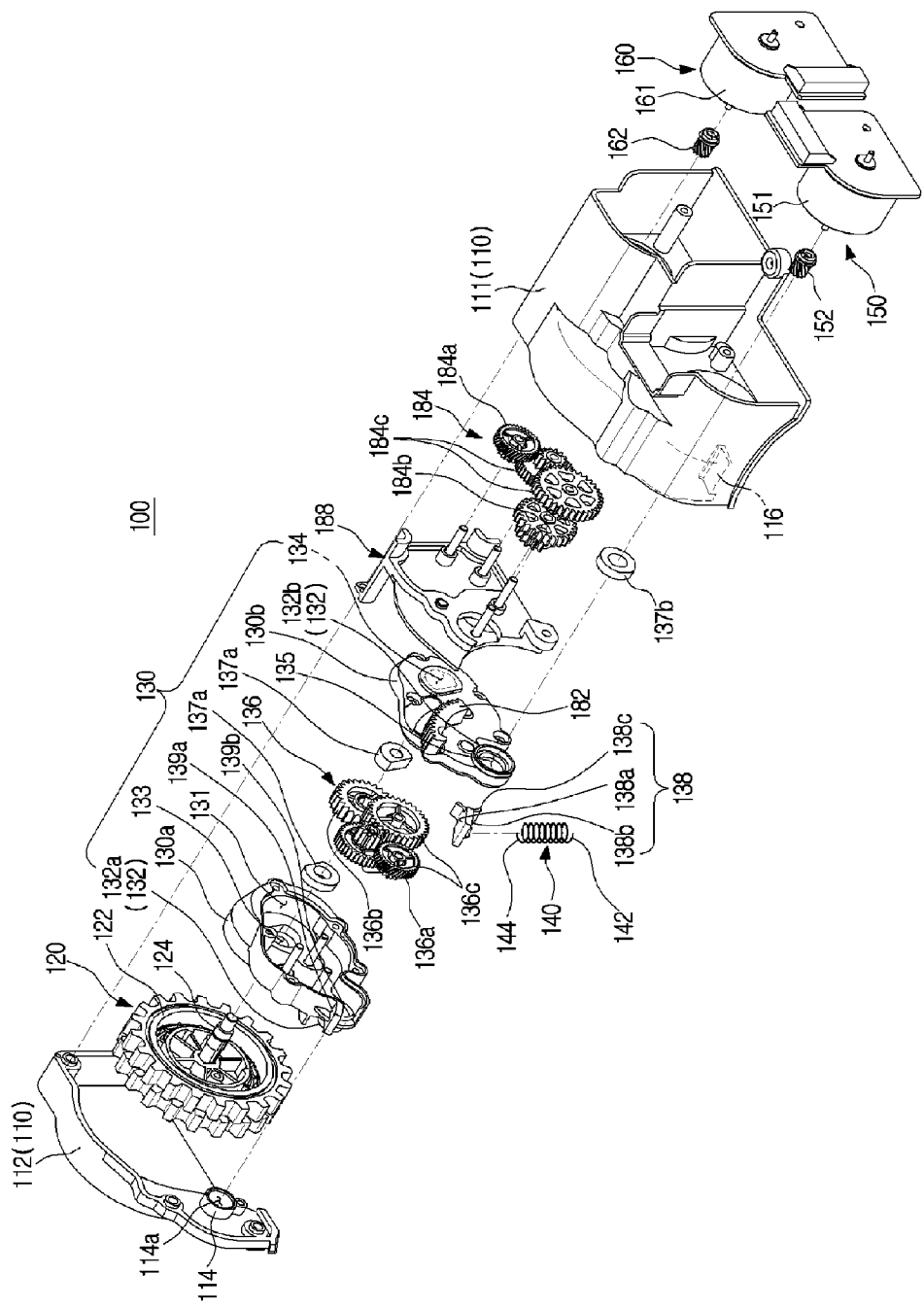
FIG. 4 is an exploded perspective view of a driving unit in accordance with one embodiment of the present invention.
Figure 5:
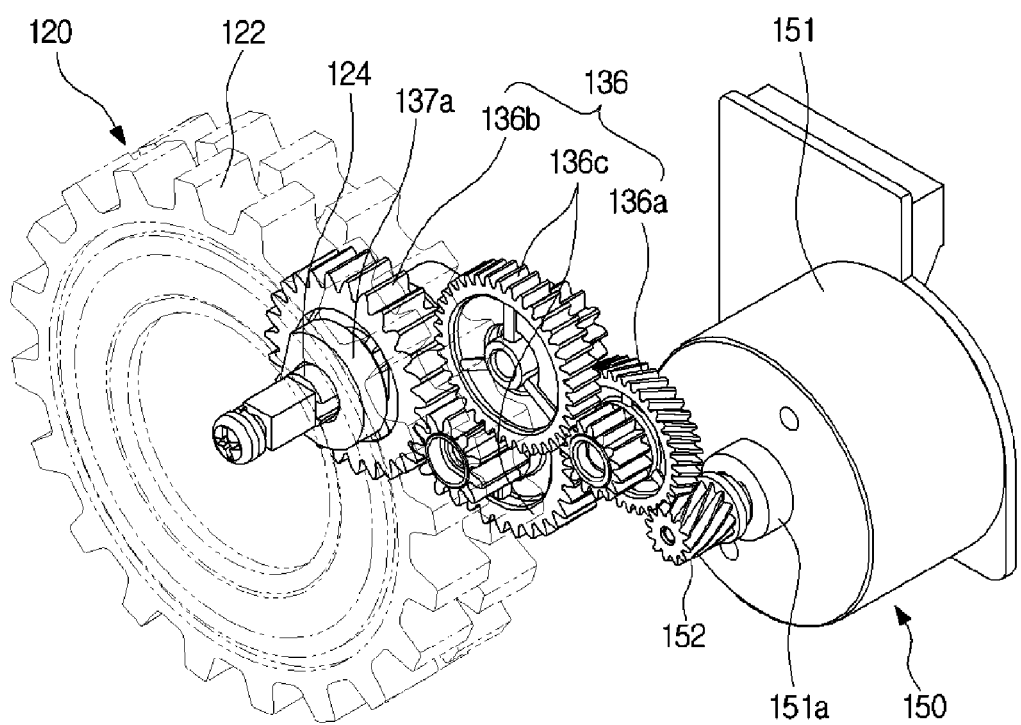
FIG. 5 is a perspective view of a wheel driving unit of FIG. 3.
Figure 6:
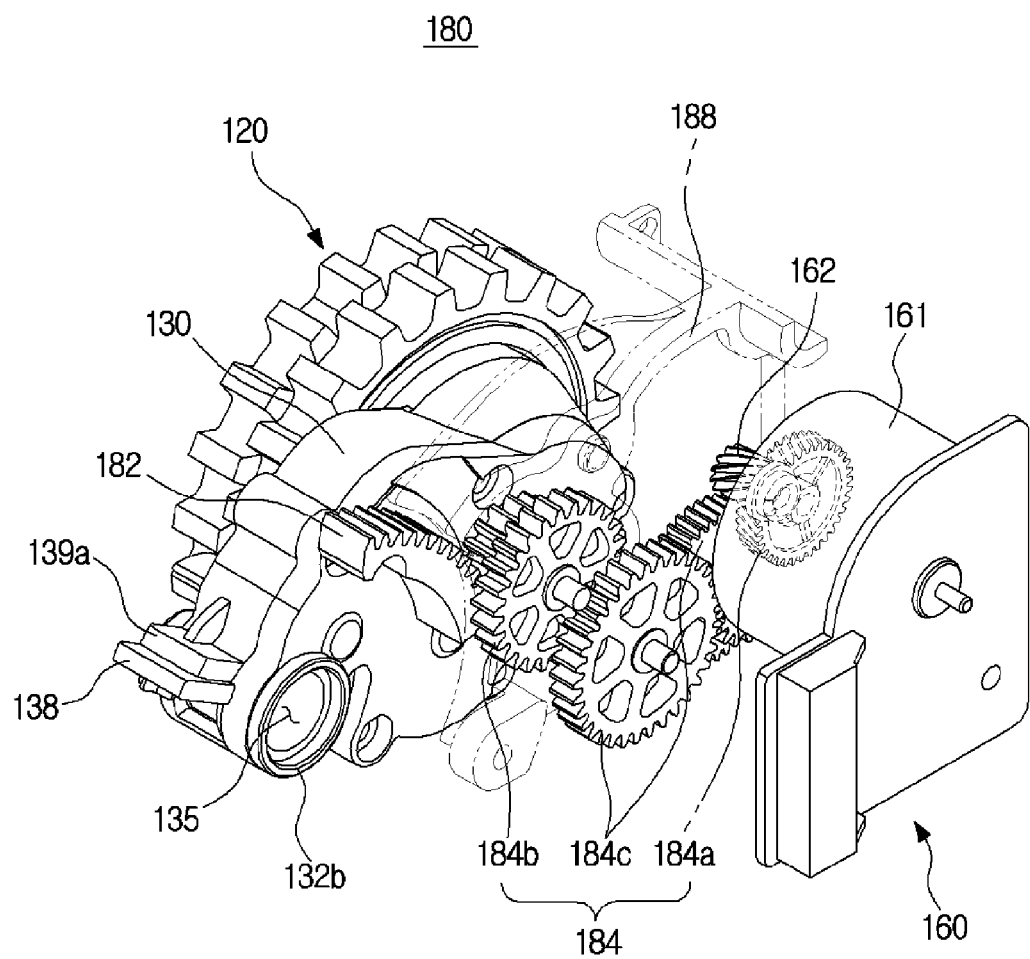
FIG. 6 is a perspective view of a wheel frame driving unit of FIG. 3.

FIG. 3 is a perspective view of a driving unit 100 in accordance with one embodiment of the present invention. FIG. 4 is an exploded perspective view of the driving unit 100 in accordance with one embodiment of the present invention. FIG. 5 is a perspective view of a wheel driving unit 170 included in the driving unit 100 of FIG. 3. FIG. 6 is a perspective view of a wheel frame driving unit 180 included in the driving unit 100 of FIG. 3.

As illustrated in FIGS. 3 to 6, the driving unit 100 includes a housing 110, a driving wheel 120 that drives a body 10, a wheel frame 130 that supports the driving wheel 120 to be rotatable, an elastic member 140 that pressurizes the wheel frame 130, a first driving motor 150 that generates driving power for rotating the driving wheel 120, and a second driving motor 160 that generates driving power for rotating the wheel frame 130.

The housing 110 includes a housing body 111, a housing cover 112 coupled to a side of the housing body 111, a storage unit 113 formed by the housing body 111 and the housing cover 112, a support protrusion 114 that supports the wheel frame 130 to be rotatable, a first support rib 116 that supports one end of the elastic member 140, and a stopper 118 (see FIG. 7A) that limits rotation of a holder 138.

A lower portion of the housing 110 is open such that the driving wheel 120 and the wheel frame 130 vertically move according to the type and state of a bottom surface of a space to be cleaned.

In the storage unit 113, the driving wheel 120, the wheel frame 130, the elastic member 140, the first driving motor 150, the second driving motor 160, and the like are contained.

The support protrusion 114 protrudes from an inner surface of the housing cover 112 toward the storage unit 113. A storage hole 114a is disposed in the center of the support protrusion 114 to store a first spindle 132a of the wheel frame 130 so that the wheel frame 130 may rotate on the support protrusion 114.

The first support rib 116 protrudes from an inner surface of the housing body 111 toward the storage unit 113 to support one end of the elastic member 140.

The stopper 118 is formed on an inner surface of the housing body 111 to limit rotation of the holder 138.

The driving wheel 120 includes a wheel 122 that is directly in contact with a bottom surface of an area to be cleaned so as to move the body 10, and a drive shaft 124 fixed on the wheel 122 to drive the wheel 122 to be rotated. The drive shaft 124 is coupled to the wheel frame 130 to be rotatable while passing through the wheel frame 130. A drive shaft gear 136b among first power transfer gears 136 is fixed on the drive shaft 124. The drive shaft 124 forms the center of rotation C2 (see FIG. 7A) of the driving wheel 120.

The wheel frame 130 includes a first frame 130a and a second frame 130b coupled to each other to form a gear storage unit 131, frame spindles 132 that protrude from an external surface of the first frame 130a and an external surface of the second frame 130b, and the first power transfer gears 136 contained in the gear storage unit 131 to transfer the driving power from the first driving motor 150 to the driving wheel 120.

A first through-hole 133 is formed in the first frame 130a through which the drive shaft 124 passes through the first frame 130a to be contained in the gear storage unit 131. A support hole 134 is formed in an inner surface of the second frame 130b to store a bearing 137a, which is coupled to an end portion of the drive shaft 124 contained in the gear storage unit 131 to support the drive shaft 124 to be rotatable, therein. Bearings 137a that support the drive shaft 124 to be rotatable may be inserted into the first through-hole 133 and the support hole 134. A second through-hole 135 is formed in the second frame 130b through which a motor shaft 152 of the first driving motor 150 passes through the second frame 130b to be contained in the gear storage unit 131.

The frame spindle 132 includes the first spindle 132a that protrudes from an external surface of the first frame 130a, and a second spindle 132b that protrudes from an external surface of the second frame 130b in a direction opposite the direction in which the first spindle 132a protrudes. The first spindle 132a and the second spindle 132b are disposed on the same axle. The first spindle 132a is contained in the storage hole 114a of the support protrusion 114 to be rotatable. The second spindle 132b stores a support shaft 151a protruding from a motor housing 151 of the first driving motor 150. Bearings 137b that support the second spindle 132b to be rotatable may be inserted between the second spindle 132b and the support shaft 151a.

The first power transfer gears 136 include a motor shaft gear 136a engaged with the motor shaft 152 of the first driving motor 150, the drive shaft gear 136b fixed on the drive shaft 124 of the driving wheel 120, and a plurality of connection gears 136c that connect the motor shaft gear 136a and the drive shaft gear 136b. The speed of rotation of the motor shaft 152 is reduced as the motor shaft 152 passes through the first power transfer gears 136.

Also, the wheel frame 130 includes the holder 138 that supports the elastic member 140 together with the first support rib 116, a second support rib 139a that protrudes from external surfaces of the first frame 130a and the second frame 130b to support the holder 138, and a guide hole 139b that guides rotation of the holder 138.

The holder 138 includes a rotation unit 138a coupled to the guide hole 139b to be rotatable, a support unit 138b that protrudes from the rotation unit 138a in the direction of the radius of the rotation unit 138a to support the elastic member 140, and a separation prevention unit 138c contained in the wheel frame 130 to prevent separation of the rotation unit 138a.

The support unit 138b is pressurized by the elastic member 140 within a tensile strength range of elastic member 140. The support unit 138b pressurized by the elastic member 140 applies pressure onto the second support rib 139a while being in contact with the second support rib 139a, thereby rotating the wheel frame 130. That is, tensile strength of the elastic member 140 is delivered to the wheel frame 130 via the support unit 138b of the holder 138 and the second support rib 139a of the wheel frame 130, thereby rotating the wheel frame 130. In contrast, an impact delivered through the driving wheel 120 while the body 10 drives decreases as the impact is delivered to the elastic member 140 through the wheel frame 130, the second support rib 139a of the wheel frame 130, and the support unit 138b of the holder 138.

A drive gear 182 is disposed on an external surface of the second frame 130b. The drive gear 182 may protrude from the external surface of the second frame 130b to be formed integrally with the second frame 130b. Driving power generated by the second driving motor 160 rotates the wheel frame 130 through second power transfer gears 184 and the drive gear 182.

The elastic member 140 includes a compressive coiled spring, and is disposed between the first support rib 116 of the housing 110 and the support unit 138b of the holder 138 to pressurize the wheel frame 130 in one direction.

The elastic member 140 includes a fixed end 142 supported by and fixed on the first support rib 116, and a pressurization end 144 supported by and fixed on the support unit 138b to pressurize the holder 138.

Figure 7A:
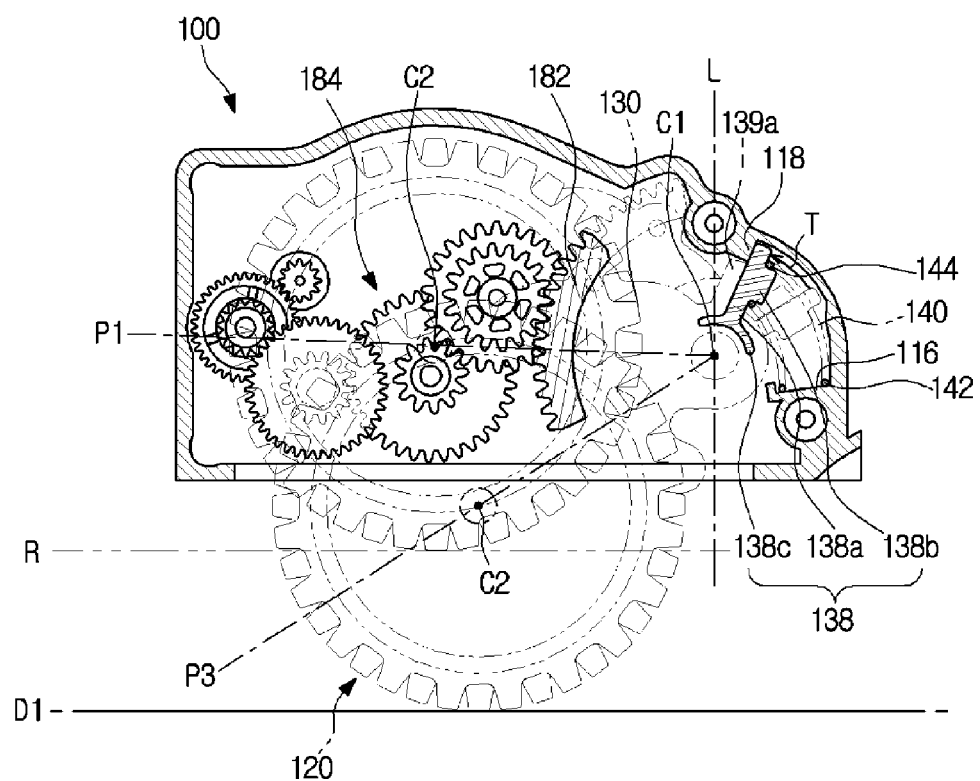
FIG. 7A is a diagram illustrating the ranges of movement of a driving wheel and a wheel frame in a normal driving state of a cleaning robot in accordance with one embodiment of the present invention.
Figure 7B:
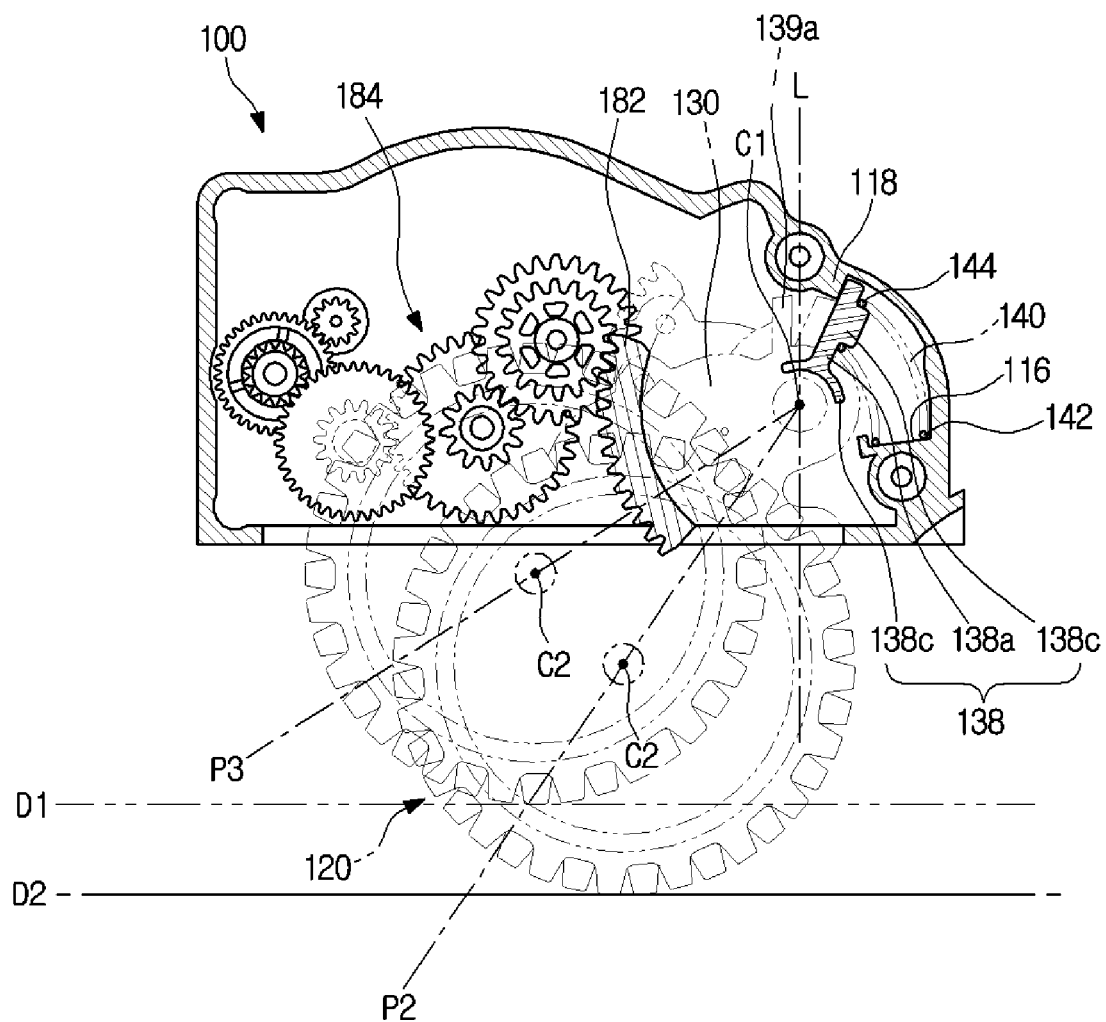
FIG. 7B is a diagram illustrating the ranges of movement of a driving wheel and a wheel frame in the stuck state of a cleaning robot in accordance with one embodiment of the present invention.

The elastic member 140 is disposed on a location opposite the driving wheel 120 with respect to a vertical line L passing through the center of rotation C1 of the wheel frame 130, and disposed more adjacent to the center of rotation C1 of the wheel frame 130 than the driving wheel 120 (see FIGS. 7A and 7B).

The elastic member 140 is disposed in a compressed state to pressurize the holder 138 in the direction of a tangent line of a trajectory T formed by one end of the support unit 138b. Pressure applied onto the holder 138 by the elastic member 140 is delivered to the driving wheel 120, which is in contact with a bottom surface, through the second support rib 139a and the wheel frame 130.

The first driving motor 150 includes the motor housing 151 contained and fixed in the housing 110, and the support shaft 151a protruding from the motor housing 151. The support shaft 151a is contained in the second spindle 132b.

The motor shaft 152 of the first driving motor 150 is contained in the gear storage unit 131 through the second through-hole 135 formed in the second frame 130b, and is engaged with the motor shaft gear 136a. Driving power generated by the first driving motor 150 is delivered to the drive shaft 124 through the motor shaft 152, the motor shaft gear 136a, the plurality of connection gears 136c, and the drive shaft gear 136b, thereby rotating the wheel 122.

The second driving motor 160 includes a motor housing 161 and a motor shaft 162 contained and fixed in the housing 110. The motor shaft 162 of the second driving motor 160 is disposed to be parallel to the motor shaft 152 of the first driving motor 150.

The motor shaft 162 is engaged with a motor shaft gear 184a. Driving power generated by the second driving motor 160 is delivered to the drive gear 182 through the motor shaft 162, the motor shaft gear 184a, a plurality of connection gears 184c, and a tilt gear 184b, thereby rotating the wheel frame 130.

As illustrated in FIG. 5, the wheel driving unit 170 includes the first driving motor 150 and the first power transfer gears 136. Driving power generated by the first driving motor 150 drives the driving wheel 120 through the first power transfer gears 136.

As illustrated in FIG. 6, the wheel frame driving unit 180 includes the second driving motor 160, the drive gear 182, and the second power transfer gears 184 between the second driving motor 160 and the drive gear 182. The second power transfer gears 184 include the motor shaft gear 184a fixed on the motor shaft 162 of the second driving motor 160, the tilt gear 184b engaged with the drive gear 182, and the plurality of connection gears 184*c* that connect the motor shaft gear 184*a* and the tilt gear 184*b*. The second power transfer gears 184 are supported by a support frame 188 fixed on the housing body 111 to be rotatable. The speed of rotation of the motor shaft 162 is reduced as the motor shaft 162 passes through the second power transfer gears 184.

Although the embodiment in which power is delivered between the first driving motor 150 and the driving wheel 120 and between the second driving motor 160 and the wheel frame 130 using the first power transfer gears 136 and the second power transfer gears 184 has been described above, power may be delivered via a power transfer belt.

FIG. 7A is a diagram illustrating the ranges of movement of a driving wheel 120 and a wheel frame 130 in a normal driving state of the cleaning robot 1 in accordance with one embodiment of the present invention. FIG. 7B is a diagram illustrating the ranges of movement of a driving wheel 120 and a wheel frame 130 in the stuck state of the cleaning robot 1 in accordance with one embodiment of the present invention;

As illustrated in FIG. 7A, the wheel frame 130 rotates between a first position P1 and a third position P3 and the driving wheel 120 moves between a reference position R and a first falling position D1 in a state in which the cleaning robot 1 drives normally. A maximum rotation position of the wheel frame 130 is the third position P3 when a tensile force is applied onto the elastic member 140. In this case, a maximum falling position of the driving wheel 120 is the first falling position D1.

As illustrated in FIG. 7B, when the cleaning robot 1 is in the stuck state, the wheel frame 130 rotates between a third position P3 and a second position P2 and the driving wheel 120 moves between a first falling position D1 and a second falling position D2. A maximum rotation position of the wheel frame 130 is the second position P2 due to driving power generated by the second driving motor 160. In this case, a maximum falling position of the driving wheel 120 is the second falling position D2.

Figure 8:
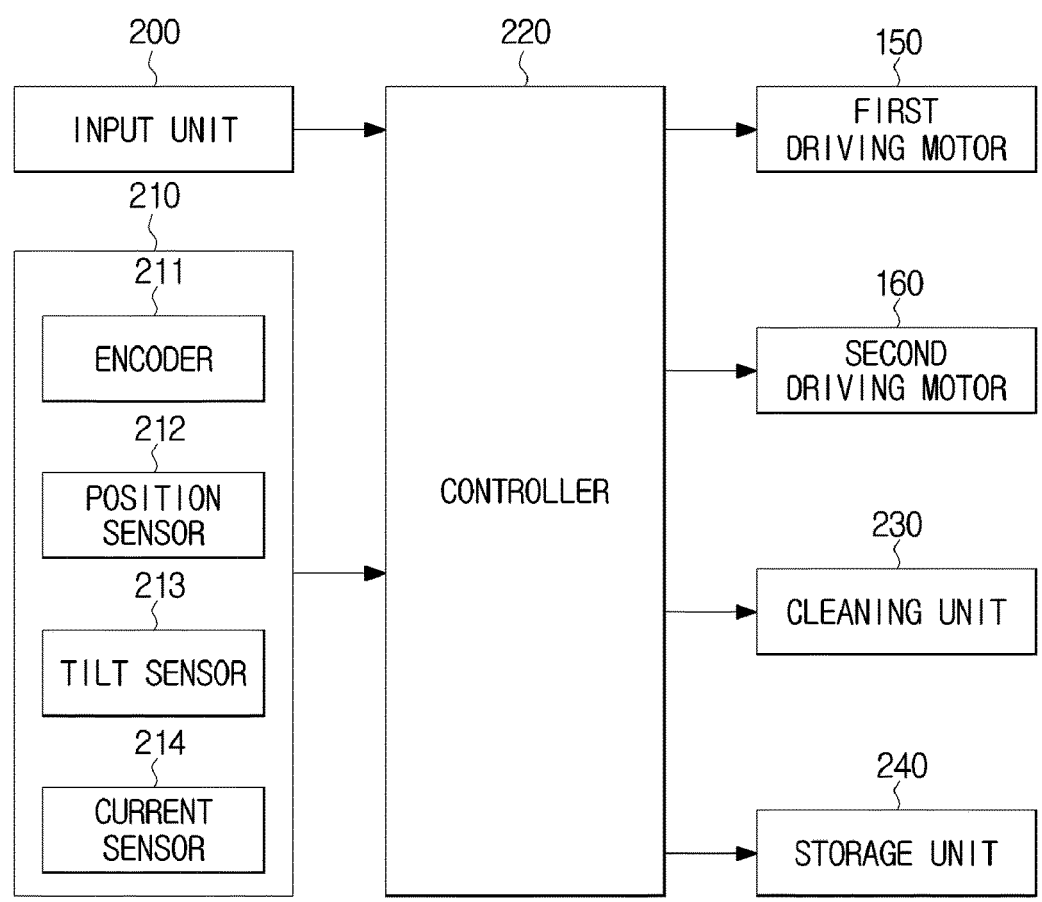
FIG. 8 is a control block diagram of a cleaning robot in accordance with one embodiment of the present invention.

FIG. 8 is a control block diagram of a cleaning robot 1 in accordance with one embodiment of the present invention.

As illustrated in FIG. 8, the cleaning robot 1 includes an input unit 200 via which a motion command is input from a user; a sensor unit 210 that detects various information regarding a region to be cleaned through which the cleaning robot 1 drives; and a controller 220 that determines a driving state (stuck state) of the cleaning robot 1 and controls the first driving motor 150 and the second driving motor 160, based on the motion command input via the input unit 200 and sensor information detected by the sensor unit 210.

The input unit 200 includes a plurality of buttons on either the body 10 or a remote control (not shown) to receive the motion command or a cleaning command with respect to the cleaning robot 1 from a user and to transmit these commands to the controller 220.

The sensor unit 210 includes an encoder 211 that measures the amount of rotational movement of the first driving motor 140 and the second driving motor 160 according to the motion command from the user, a position sensor 212 that measures an actual moving distance of the cleaning robot 1, a tilt sensor 213 that measures an angle (direction) to which the cleaning robot 1 actually moves, and a current sensor 214 that measures current flowing through the first driving motor 140 and the second driving motor 160.

At least one position sensor 212 may be installed at any location provided that the movement of an actual movement of the cleaning robot 1 may be measured. The tilt sensor 213 denotes a sensor module capable of measuring the inclination of the cleaning robot 1. Examples of the tilt sensor 213 include not only a gyro sensor that directly measures the inclination of the cleaning robot 1 based on the direction of gravity but also a 3-axis acceleration sensor and a 3-axis angular velocity sensor that measure the inclination of cleaning robot 1 through sensor fusion. Also, the tilt sensor 213 may be a 2-axis tilt sensor capable of detecting whether the stuck state occurs, generating stuck conditions, and measuring a roll/pitch value by measuring the inclination of and a variation in the inclination of the cleaning robot 1.

The current sensor 214 is installed in a power supply circuit (not shown), measures a load on the first driving motor 150 or the second driving motor 160, and transmits a result of measuring the load to the controller 220.

The controller 220 is configured to control overall operations of the cleaning robot 1, and controls the first driving motor 150 to move the cleaning robot 1 according to the motion command received via the input unit 200. Also, the controller 220 determines whether the cleaning robot 1 is in an undriveable state (the stuck state) based on the motion command input via the input unit 200 and sensor information detected by the sensor unit 210, and controls the second driving motor 160 to cause the cleaning robot 1 to free itself from the undriveable state.

A cleaning unit 230 drives main and side brushes (not shown) to perform a cleaning operation by absorbing foreign substances such as dust from a bottom surface of a region to be cleaned, through which the cleaning robot 1 drives, according to a driving command from the controller 220.

A storage unit 240 stores a driving pattern and path that are predetermined according to a cleaning command from the cleaning robot 1, sensor information detected during the movement of the cleaning robot 1, etc. The storage unit 240 may further store map information of the region to be cleaned.

Figure 9:
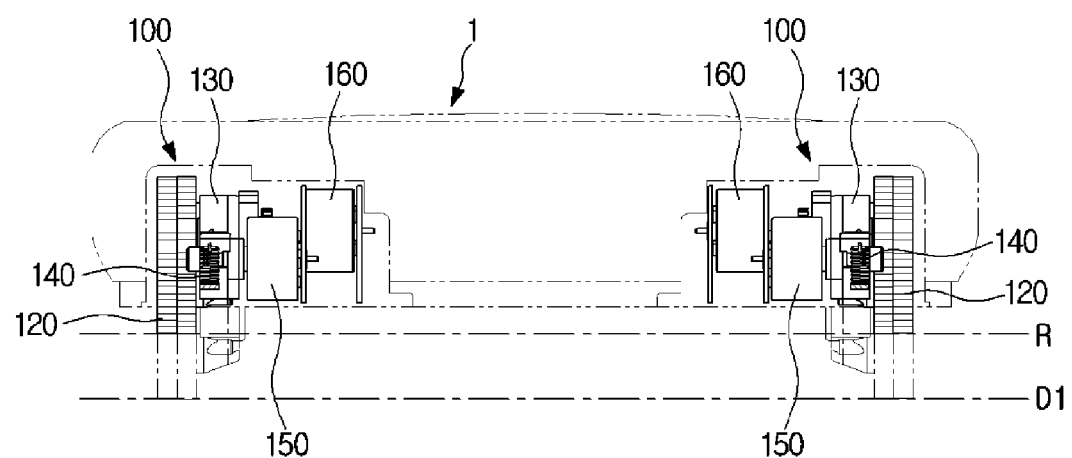
FIG. 9 is a diagram illustrating a normal driving state of a cleaning robot in accordance with one embodiment of the present invention.
Figure 10:
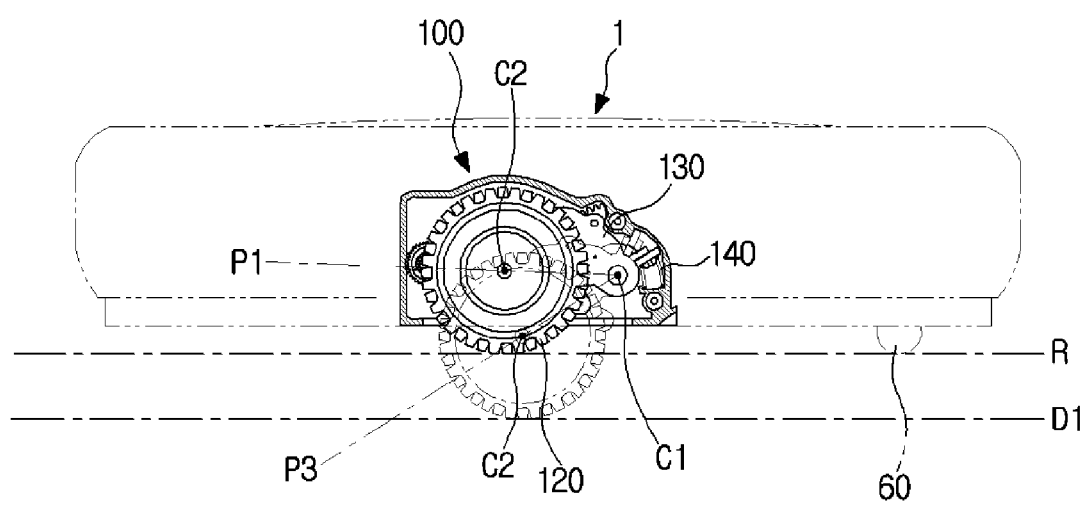
FIG. 10 is a side view of FIG. 9.

FIG. 9 is a diagram illustrating a normal driving state of a cleaning robot 1 in accordance with one embodiment of the present invention. FIG. 10 is a side view of FIG. 9.

As illustrated in FIGS. 9 and 10, when the cleaning robot 1 drives normally, a wheel frame 130 rotates between a first position P1 and a third position P3 while being pressurized by an elastic member 140 or pressurizing the elastic member 140. As the wheel frame 130 rotates, a driving wheel 120 moves between a reference position R and a first falling position D1.

Traction between the driving wheel 120 and a bottom surface, which is needed for the cleaning robot 1 to drive normally, may be secured by rotating the wheel frame 130 by applying pressure onto the wheel frame 130 by the elastic member 140. Thus, the controller 220 does not operate the second driving motor 160.

Figure 11A:
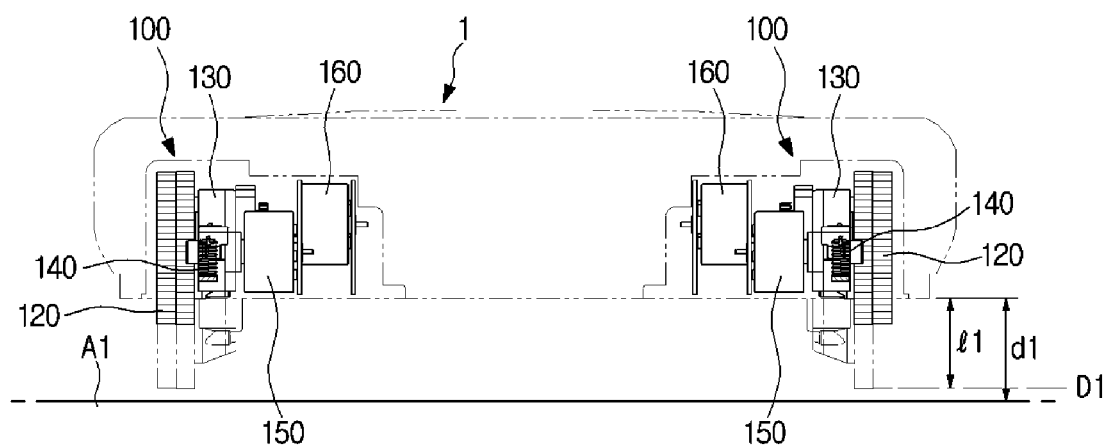
FIGS. 11A to 11C are diagrams illustrating a process in which a cleaning robot escapes from the stuck state occurring due to a lifted phenomenon (a state in which both of driving wheels of the cleaning robot are lifted, thereby preventing the cleaning robot from driving) in accordance with one embodiment of the present invention.
Figure 11B:
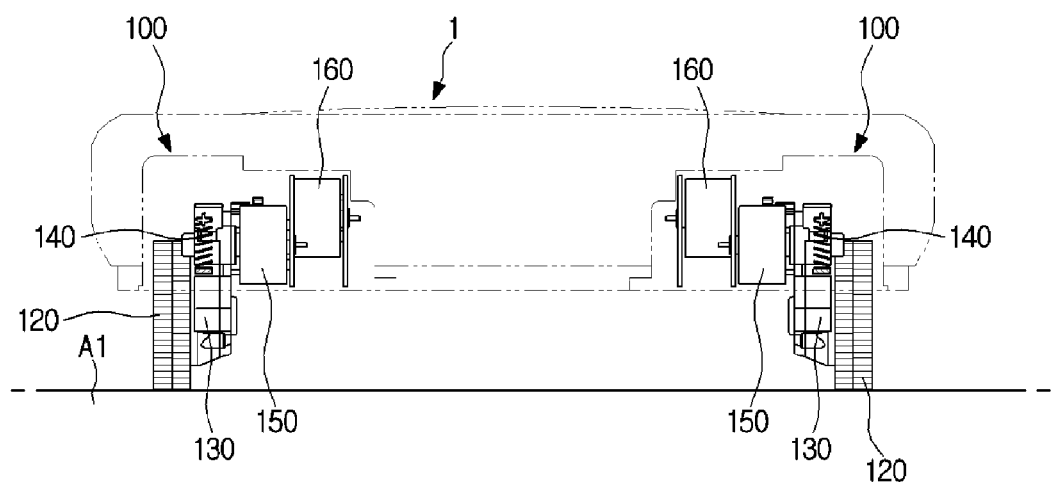
Figure 11C:
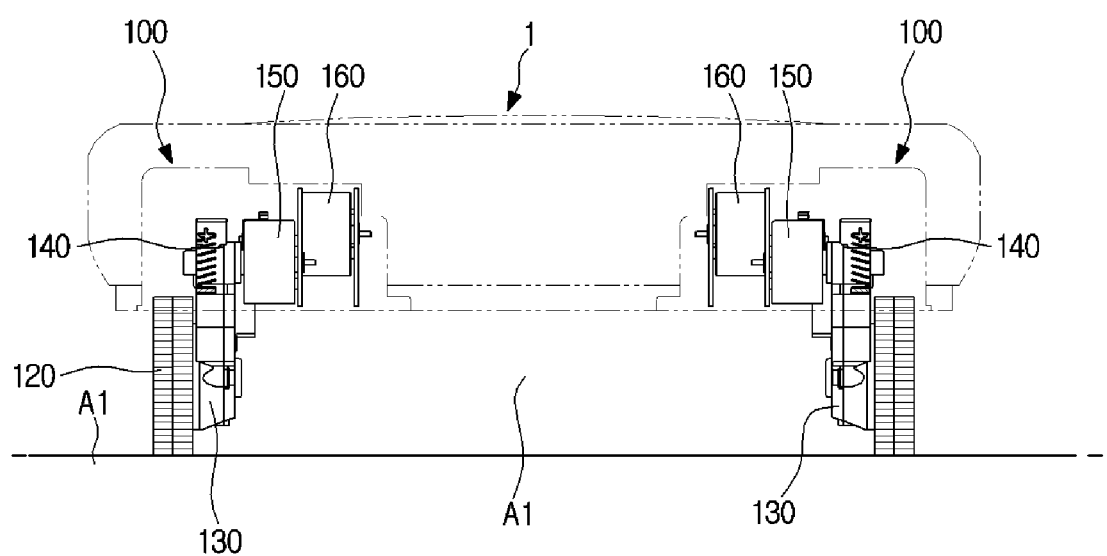
Figure 12A:
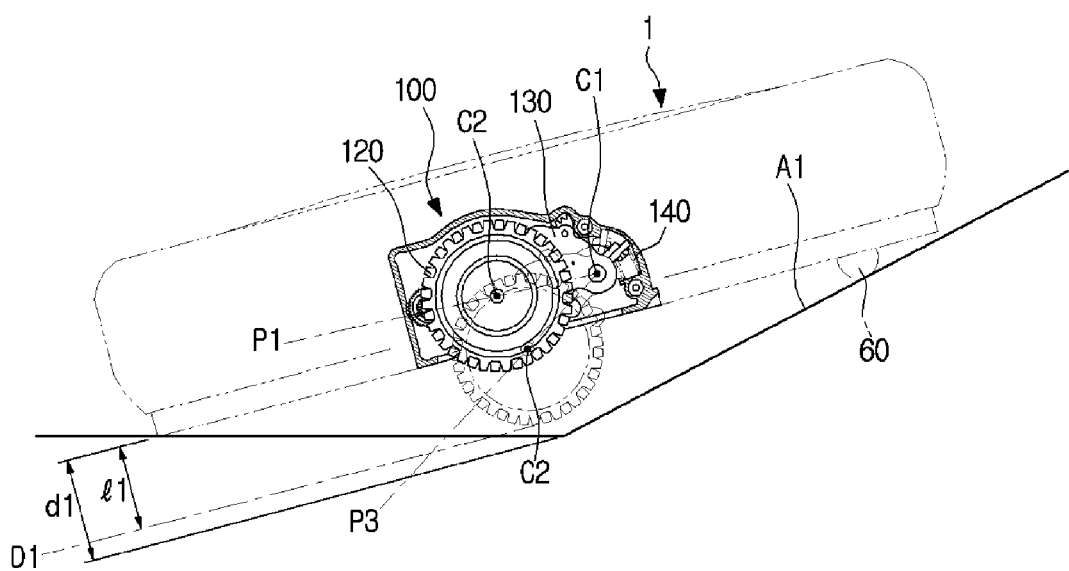
FIGS. 12A to 12C are side views of FIGS. 11A to 11C, respectively.
Figure 12B:
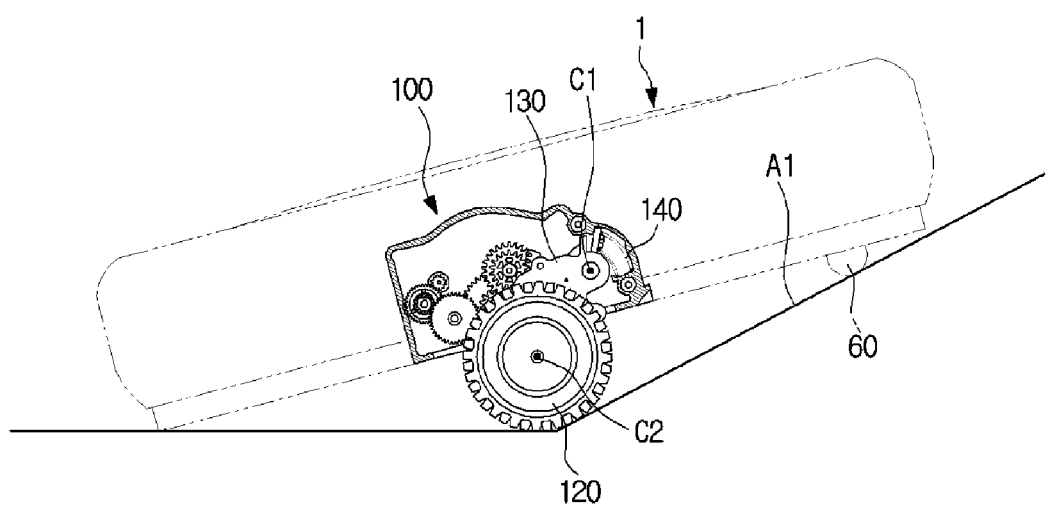
Figure 12C:
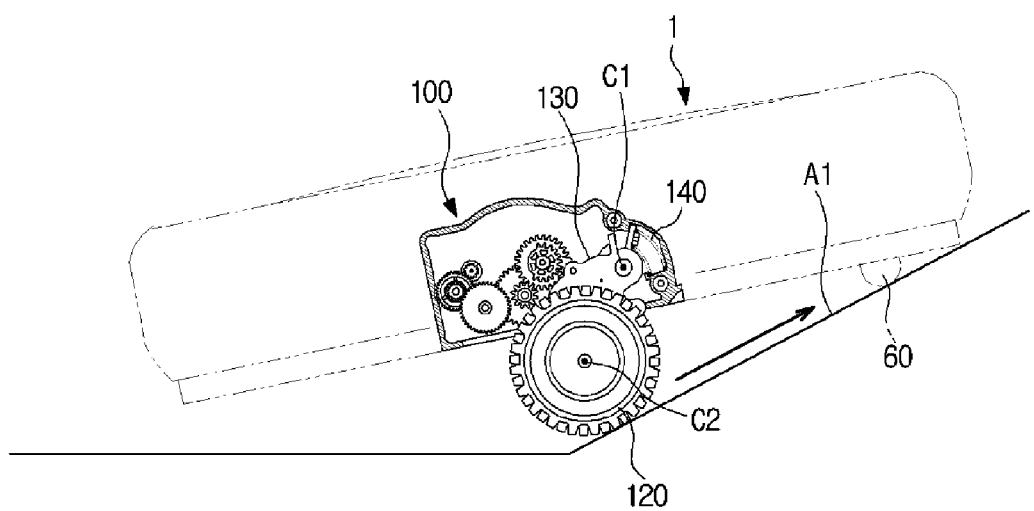

FIGS. 11A to 11C are diagrams illustrating a process in which a cleaning robot 1 escapes from the stuck state occurring due to a lifted phenomenon (a state in which both of driving wheels 120 of the cleaning robot 1 are lifted, thereby preventing the cleaning robot 1 from driving) in accordance with one embodiment of the present invention. FIGS. 12A to 12C are side views of FIGS. 11A to 11C, respectively.

As illustrated in FIGS. 11A to 11C and 12A to 12C, when the cleaning robot 1 climbs onto an obstacle A1, if a distance d1 between a rear surface of the cleaning robot 1 and the obstacle A1 is greater than a maximum falling length l1 (the distance between the rear surface of the cleaning robot 1 and a first falling position D1) to which the driving wheels 120 are moved downward by pressure applied by elastic members 140, both of the driving wheels 120 are lifted ('lifted state'), causing the cleaning robot 1 to be in the stuck state preventing the cleaning robot from driving. In this case, the holders 138 of both of the driving wheels 120 are in contact with stoppers 118, thereby limiting rotation of the driving wheels 120, and the elastic members 140 cannot additionally pressurize wheel frames 130.

When it is determined that the cleaning robot 1 is in the stuck state, the controller 220 operates second driving motors 160 of both of the driving units 100. Driving power generated by the respective second driving motors 160 is transferred to the wheel frames 130 through the second power transfer gears 184 and the drive gear 182, thereby rotating the wheel frames 130. As the wheel frames 130 rotate, the driving wheels 120 are moved downward toward a bottom surface of the obstacle A1. In this case, the wheel frames 130 may rotate from a third position P3 to a second position P2 and the driving wheels 120 may be moved from the first falling position D1 to the second falling position D2.

When the driving wheels 120 are grounded to the bottom surface of the obstacle A1 to restore driving power enough to escape from the stuck state, the controller 220 stops the second driving motors 160.

Then, after the cleaning robot 1 escapes from the stuck state to be able to be free of the obstacle A1, the cleaning robot 1 is controlled to return to a normal driving state to restore a cleaning performance thereof.

However, the second driving motors 160 do not always operate independently from the elastic members 140 in a state in which they are pressurized by the elastic members 140. For example, traction generated between the driving wheels 120 and the bottom surface by only pressure applied by the elastic members 140 may be insufficient according to the material of the bottom surface. In this case, the controller 220 may operate the second driving motors 160 to increase the traction between the driving wheel 120 and the bottom surface, thereby restoring the driving performance of the cleaning robot 1.

Figure 13A:
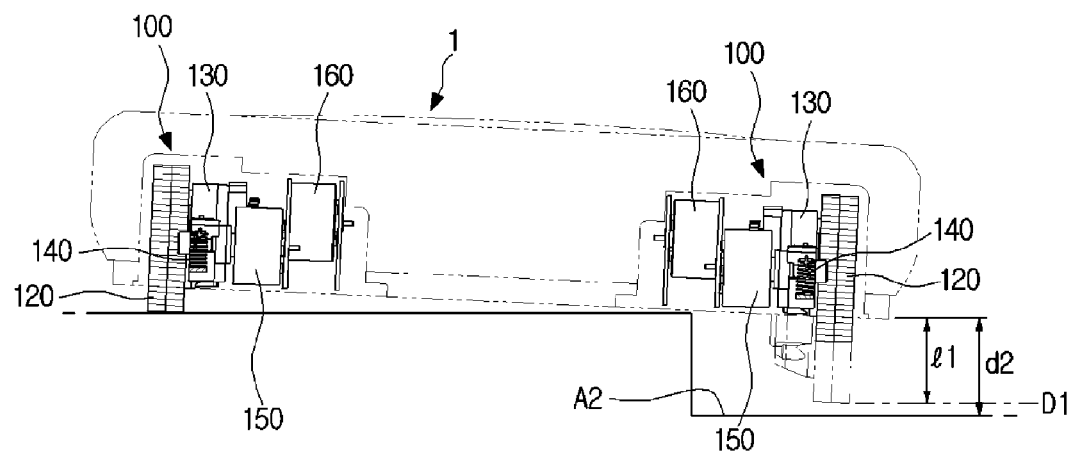
FIGS. 13A to 13C are diagrams illustrating a process in which a cleaning robot escapes from the stuck state occurring due to a lifted phenomenon (a state in which one of the driving wheels of the cleaning robot is lifted, thereby preventing the cleaning robot from driving) in accordance with another embodiment of the present invention.
Figure 13B:
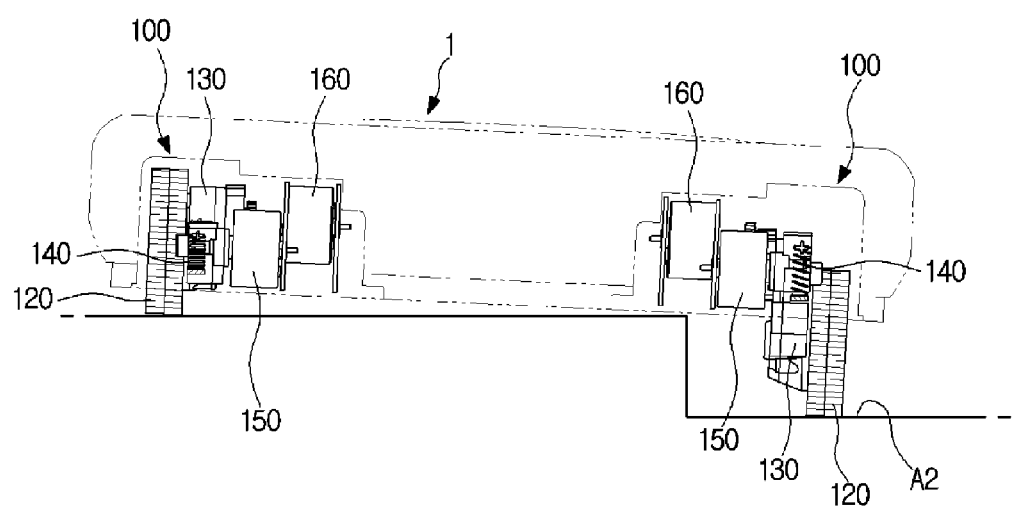
Figure 13C:
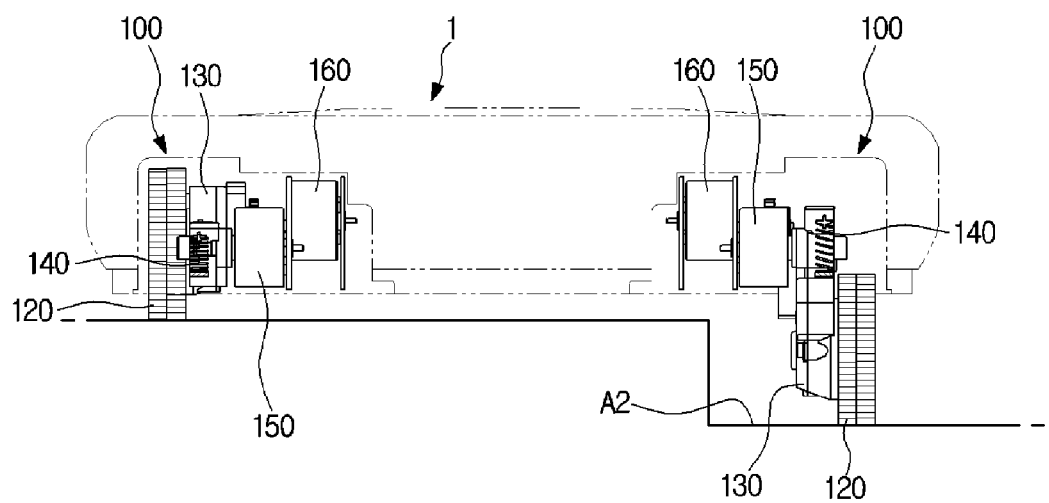
Figure 14A:
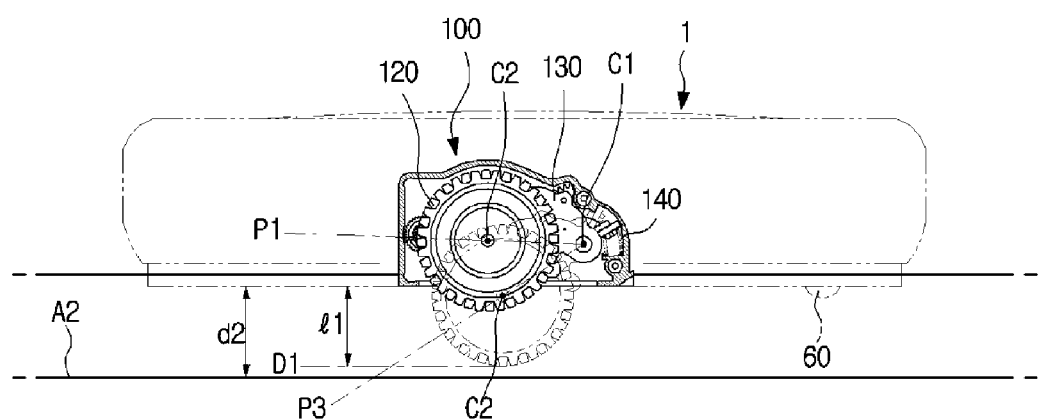
FIGS. 14A to 14C are side views of FIGS. 13A to 13C, respectively.
Figure 14B:
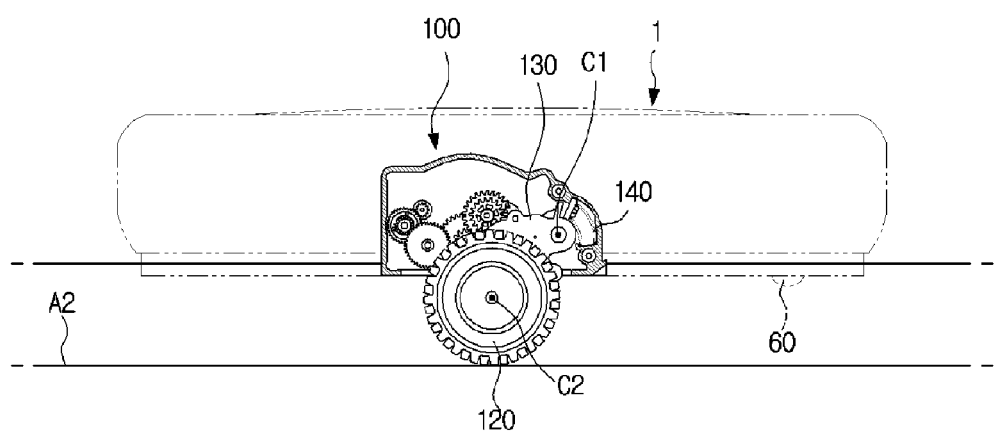
Figure 14C:
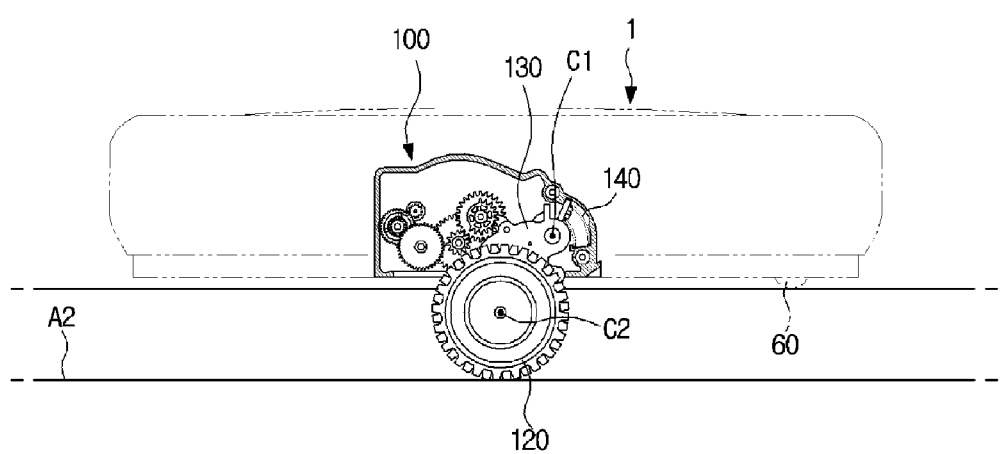

FIGS. 13A to 13C are diagrams illustrating a process in which a cleaning robot 1 escapes from the stuck state occurring due to a lifted phenomenon (a state in which one of driving wheels 120 of the cleaning robot 1 is lifted, thereby preventing the cleaning robot 1 from driving) in accordance with another embodiment of the present invention. FIGS. 14A to 14C are side views of FIGS. 13A to 13C, respectively.

As illustrated in FIGS. 13A to 13C and 14A to 14C, when the cleaning robot 1 drives on a winding bottom surface A2, if a distance d2 between a bottom surface of the cleaning robot 1 and the bottom surface A2 is greater than a maximum falling length l1 (the length between a rear surface of the cleaning robot 1 and a first falling position D1) to which the driving wheels 120 may be moved downward when the driving wheels 120 are pressurized by the elastic members 140, one of the driving wheels 120 is lifted ('lifted state'), causing the cleaning robot 1 to be in the stuck state preventing the cleaning robot 1 from driving. In this case, the holder 138 of the lifted driving wheel 120 is in contact with the stopper 118 to limit rotation of the lifted driving wheel 120 and the elastic members 140 cannot additionally pressurize wheel frames 130.

When it is determined that the cleaning robot 1 is in the stuck state, the controller 220 operates the second driving motor 160 at a part of the driving unit 100 adjacent to the lifted driving wheel 120. Driving power generated by the second driving motor 160 is delivered to the wheel frame 130 through the second power transfer gears 184 and the drive gear 182, thereby rotating the wheel frame 130. As the wheel frame 130 rotates, the lifted driving wheel 120 is moved downward toward the bottom surface A2. In this case, the wheel frame 130 may rotate from a third position P3 to a second position P2 and the lifted driving wheel 120 may move from the first falling position D1 to a second falling position D2.

When the driving wheels 120 are grounded to the bottom surface A2 to restore driving power enough to escape from the stuck state, the controller 220 stops the second driving motor 160.

Thereafter, after the cleaning robot 1 escapes from the stuck state to be able to be free of the bottom surface A2, the cleaning robot 1 is controlled to return to a normal driving state to restore the cleaning performance thereof.

Figure 15A:
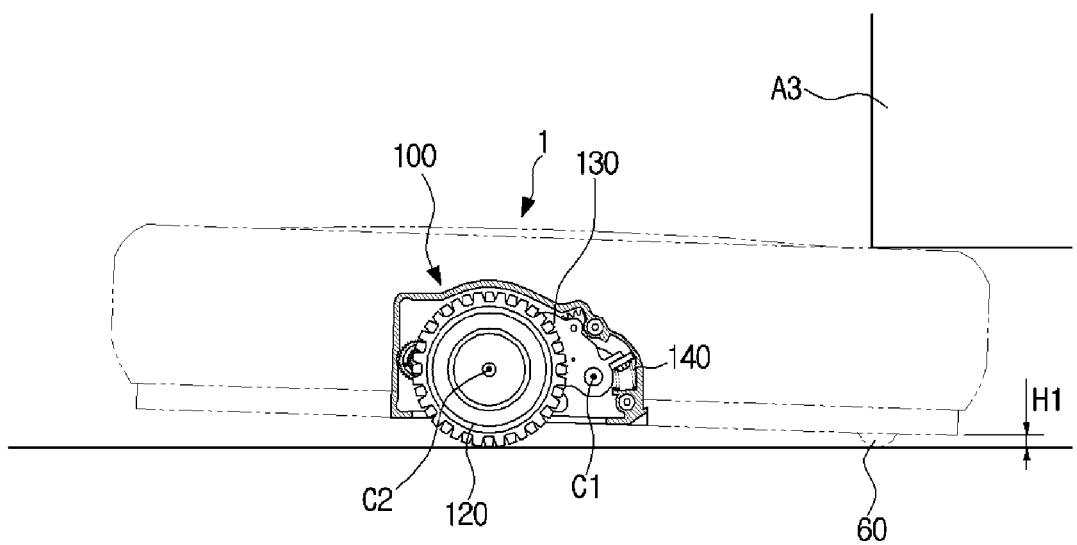
FIGS. 15A to 15C are diagrams illustrating a process in which a cleaning robot escapes from the stuck state occurring due to a caught phenomenon (a state in which a front surface of the cleaning robot is caught, for example, in a gap, thereby preventing the cleaning robot from driving) in accordance with another embodiment of the present invention.
Figure 15B:
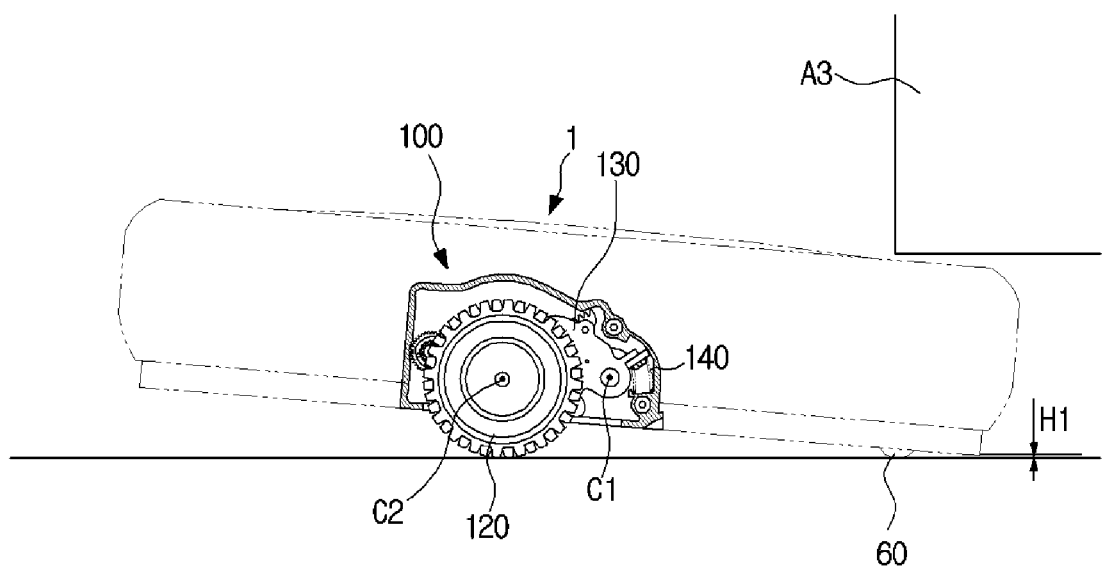
Figure 15C:
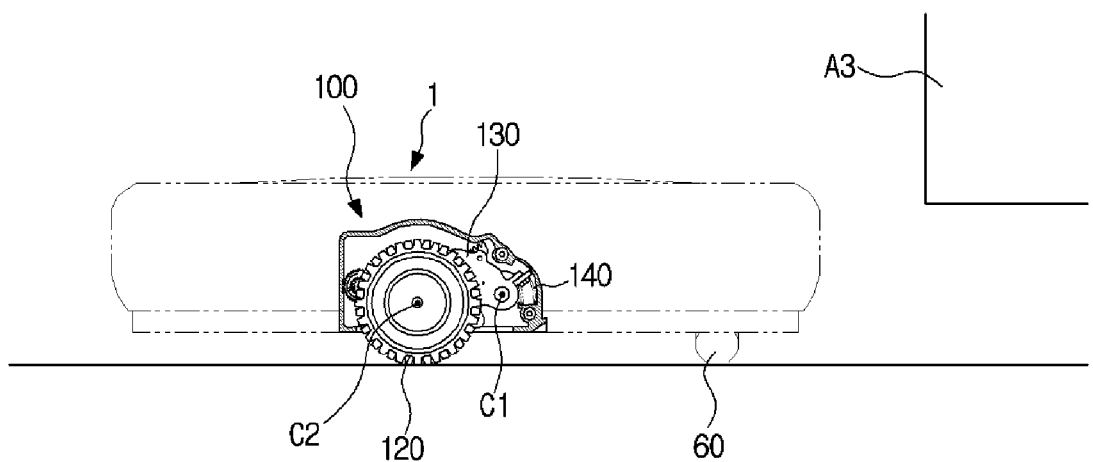

FIGS. 15A to 15C are diagrams illustrating a process in which a cleaning robot 1 escapes from the stuck state occurring due to a caught phenomenon (a state in which a front surface of the cleaning robot 1 is caught, for example, in a gap, thereby preventing the cleaning robot 1 from driving) in accordance with another embodiment of the present invention.

As illustrated in FIGS. 15A to 15C, when the cleaning robot 1 enters a narrow groove in an obstacle A3, an upper portion of a front surface of the cleaning robot 1 is caught in the narrow groove ('upper-portion-caught state'), causing the stuck state preventing the cleaning robot 1 from driving. In the stuck state occurring due to the 'upper-portion-caught state', both of the driving wheels 120 and both of the first driving motors 150 are in a constrained state. That is, the 'upper-portion-caught state' denotes a state in which driving power generated by the driving wheels 120 of both of the driving units 100 cannot be restored only by elastic forces generated by the elastic members 140.

Since both of the driving wheels 120 of both of the driving units 100 cannot rotate, over-current flows through the first driving motors 150 of both of the driving units 100. The controller 220 may sense this state using the current sensor 214 and determine the state as the stuck state occurring due to the 'upper-portion-caught state'.

When it is determined that the cleaning robot 1 is in the stuck state occurring due to the 'upper-portion-caught state', the controller 220 operates the second driving motors 160 of both of the driving units 100. Driving power generated by the second driving motors 160 is delivered to the wheel frames 130 through the second power transfer gears 184 and the drive gear 182, thereby rotating the wheel frame 130. As the wheel frames 130 rotate, the driving wheels 120 are moved downward and an overall height H1 of the cleaning robot 1 thus relatively decreases.

When the driving power generated by the driving wheels 120 is restored enough to allow the cleaning robot 1 to escape from the stuck state, the controller 220 stops the second driving motor 160.

Thereafter, after the cleaning robot 1 drives in a direction opposite the direction in which it enters the obstacle A3 so as to escape from the stuck state and to be free of the obstacle A3, the cleaning robot 1 is controlled to return to a normal driving state to restore a cleaning performance thereof.

Figure 16A:
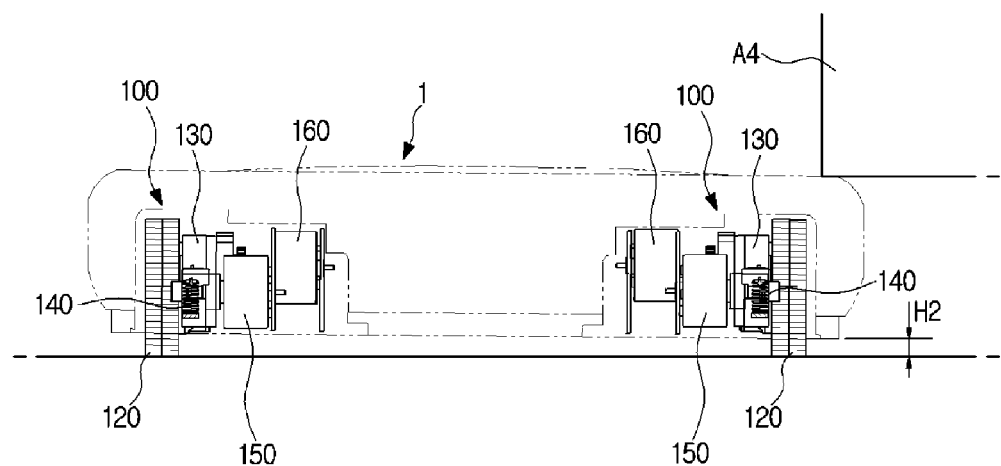
FIGS. 16A to 16B are diagrams illustrating a process in which a cleaning robot escapes from the stuck state occurring due to a caught phenomenon (a state in which a side surface of the cleaning robot is caught, for example, in a gap, thereby preventing the cleaning robot from driving) in accordance with another embodiment of the present invention.
Figure 16B:
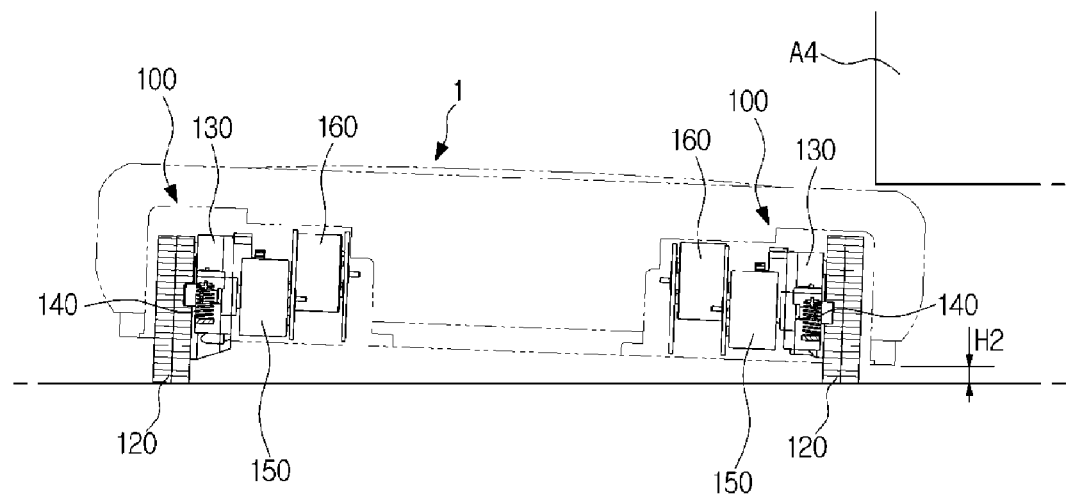

FIGS. 16A to 16B are diagrams illustrating a process in which a cleaning robot 1 escapes from the stuck state occurring due to a caught phenomenon (a state in which a side surface of the cleaning robot 1 is caught, for example, in a groove, thereby preventing the cleaning robot from driving) in accordance with another embodiment of the present invention.

As illustrated in FIGS. 16A and 16B, when the cleaning robot 1 enters a narrow groove in an obstacle A4, a side surface of the cleaning robot 1 is caught in the narrow groove ('side-surface-caught state') causing the cleaning robot 1 to be in the stuck state preventing the cleaning robot 1 from driving. In the stuck state occurring due to the 'side-surface-caught state', a driving wheel 120 and a first driving motor 150 adjacent to the caught side of the driving unit 100 are in a bound state. That is, the 'side-surface-caught state' means a state in which driving power generated by the driving wheel 120 adjacent to the caught side of the driving unit 100 cannot be restored only by an elastic force of an elastic member 140.

Since the driving wheel 120 adjacent to the caught side of the driving unit 100 cannot rotate, over-current flows through a first driving motor 150 adjacent to the caught side of the driving unit 100, and the controller 220 senses this state using the current sensor 214 and determines the state as the stuck state occurring due to the 'side-surface-caught state'.

When it is determined that the cleaning robot 1 is in the stuck state occurring due to the 'side-surface-caught state', the controller 220 operates the second driving motor 160 adjacent to a non-caught part of the driving unit 100. Driving power generated by the second driving motor 160 is delivered to the wheel frame 130 through the second power transfer gears 184 and the drive gear 182, thereby rotating the wheel frame 130. As the wheel frame 130 rotates, the driving wheel 120 is moved downward and an overall height H2 of the cleaning robot 1 thus relatively decreases.

When driving power generated by the driving wheel 120 is restored to escape from the stuck state, the controller 220 stops the second driving motor 160.

Then, after the cleaning robot 1 drives in a direction opposite the direction in which it enters the obstacle A4 to escape from the stuck state and to be free the obstacle A4, the cleaning robot 1 is restored to a normal driving state to restore a cleaning performance thereof.

Wheel frame driving units according to modified examples of the present invention will now be described. Components of the wheel frame driving units that are the same as those of the wheel frame driving unit 180 in accordance with the previous basic embodiment are allocated the same reference numerals and are thus not redundantly described here.

Figure 17:
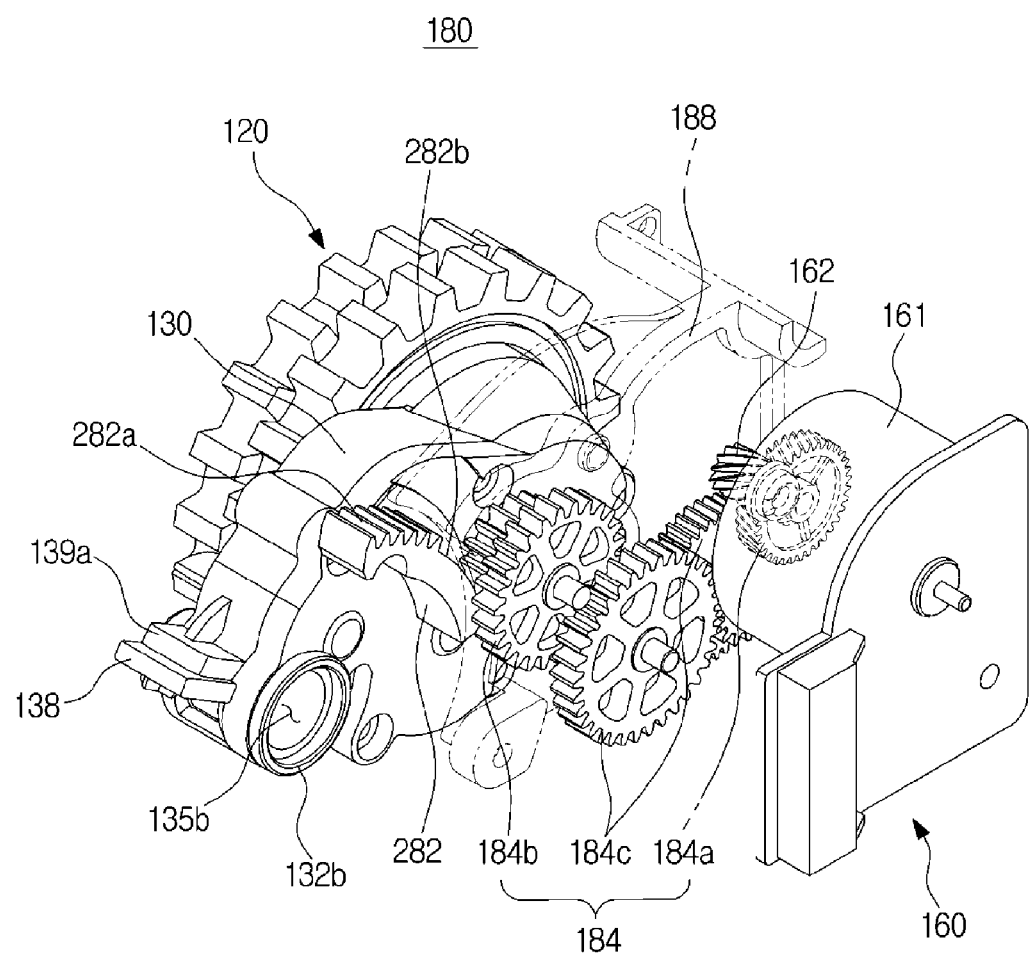
FIG. 17 is a perspective view of a wheel frame driving unit in accordance with a first modified example of the present invention.
Figure 18A:
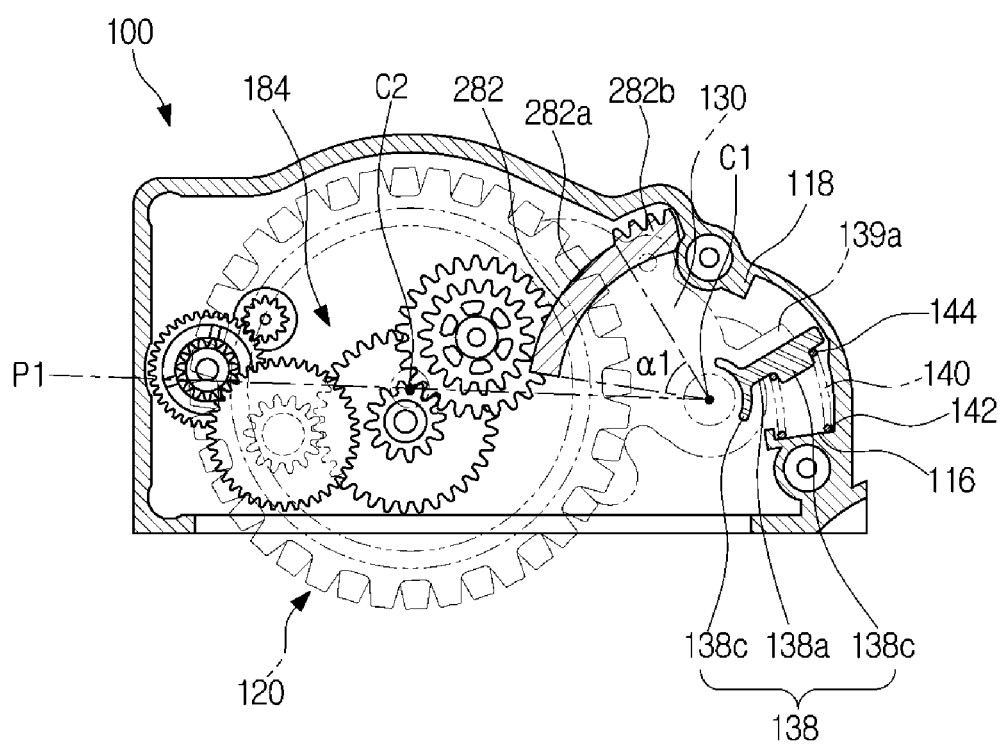
FIGS. 18A to 18C are diagrams illustrating a process of operating the wheel frame driving unit of FIG. 17.
Figure 18B:
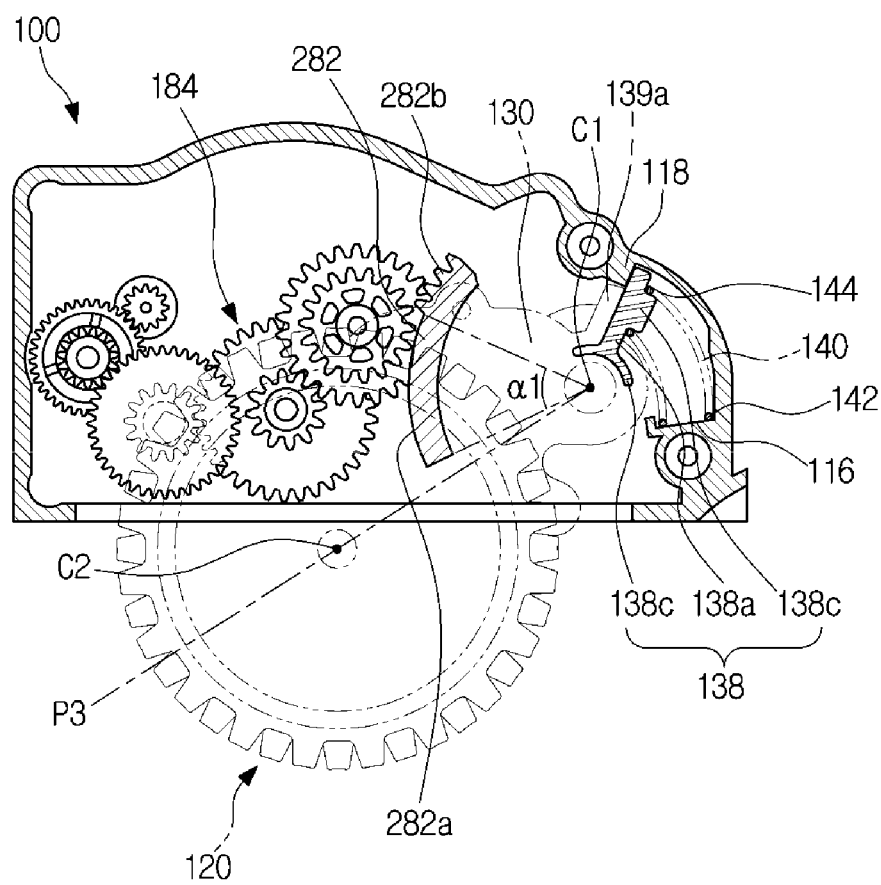
Figure 18C:
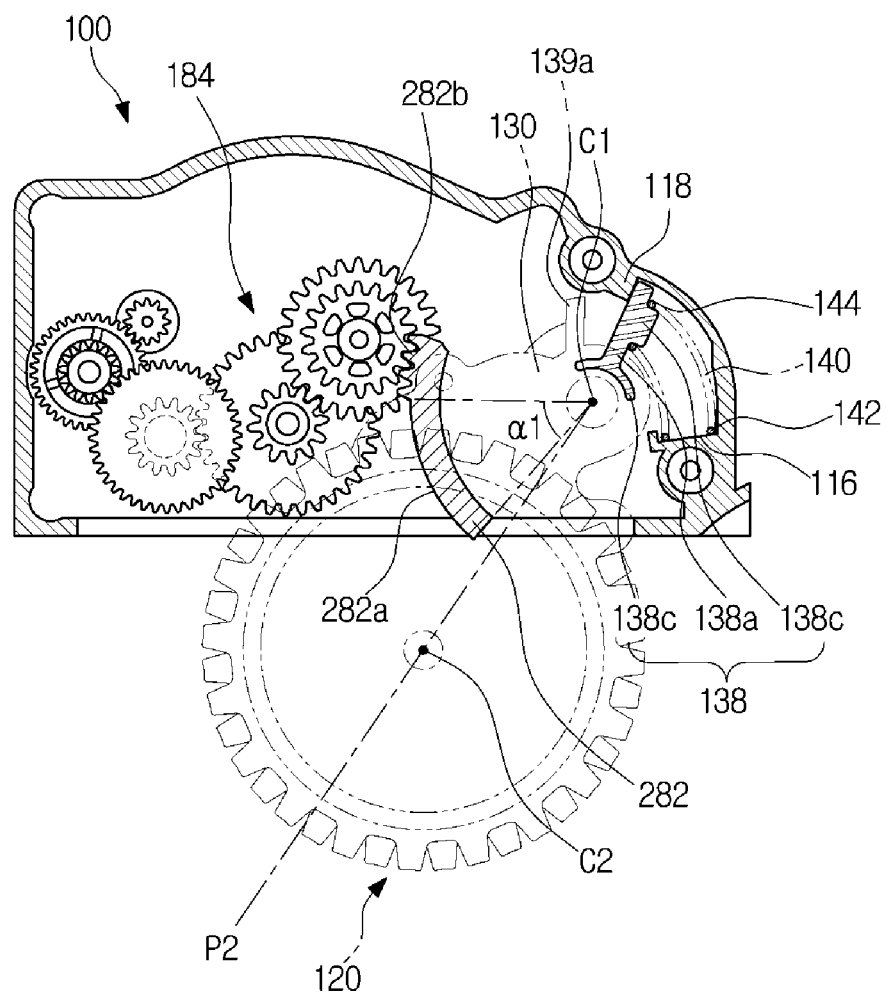

FIG. 17 is a perspective view of a wheel frame driving unit 180 in accordance with a first modified example of the present invention. FIGS. 18A to 18C are diagrams illustrating a process of operating the wheel frame driving unit 180 of FIG. 17.

As illustrated in FIGS. 17 and 18A to 18C, a power transfer prevention unit 282a is included in at least one section of a drive gear 282 disposed on an external surface of a wheel frame 130 to prevent power from being delivered between the drive gear 282 and a tilt gear 184b.

The power transfer prevention unit 282a is disposed as a flat circumferential surface on which a gear tooth 282b is not formed to prevent the drive gear 282 engaging with the tilt gear 184b, and is formed to correspond to an angle α1 between a first position P1 and a third position P3 on the wheel frame 130 in a circumferential direction of the drive gear 282.

As illustrated in FIGS. 18A and 18B, the wheel frame 130 rotates between the first position P1 and the third position P3 by pressure applied by an elastic member 140 in a state in which the cleaning robot 1 drives normally. In this case, the drive gear 282 and the tilt gear 184b are not engaged with each other due to the power transfer prevention unit 282a. Thus, when the wheel frame 130 rotates by the pressure applied by the elastic member 140, a torque is prevented from being delivered to a second driving motor 160 through the drive gear 282 and the second power transfer gears 184.

As illustrated in FIGS. 18B and 18C, if the wheel frame 130 is disposed at a third position P3 which is a maximum rotation position by the elastic member 140 when the cleaning robot 1 is in the stuck state, the drive gear 282 and the tilt gear 184b begin to be engaged with each other. Then, when the second driving motor 160 is driven, driving power generated by the second driving motor 160 is delivered to the wheel frame 130 through the tilt gear 184b and the drive gear 282, thereby rotating the wheel frame 130.

Figure 19:
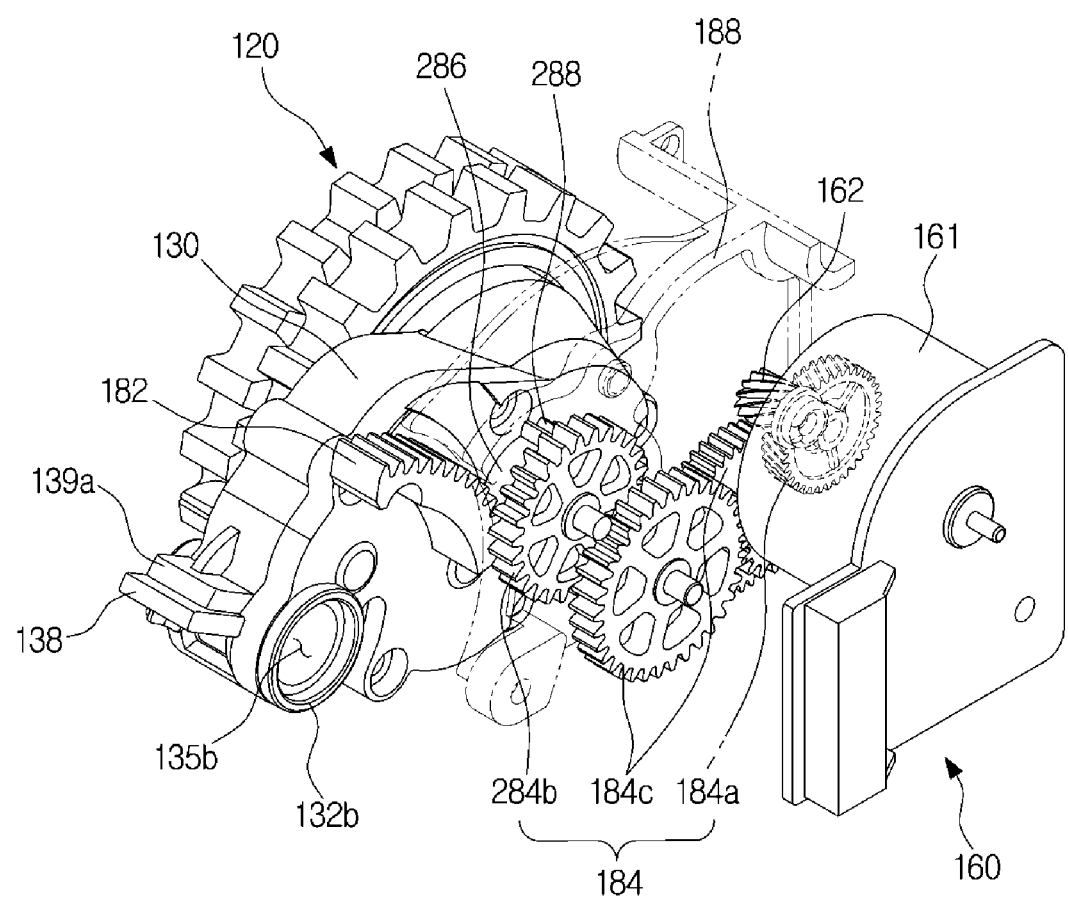
FIG. 19 is a perspective view of a wheel frame driving unit in accordance with a second modified example of the present invention.
Figure 20A:
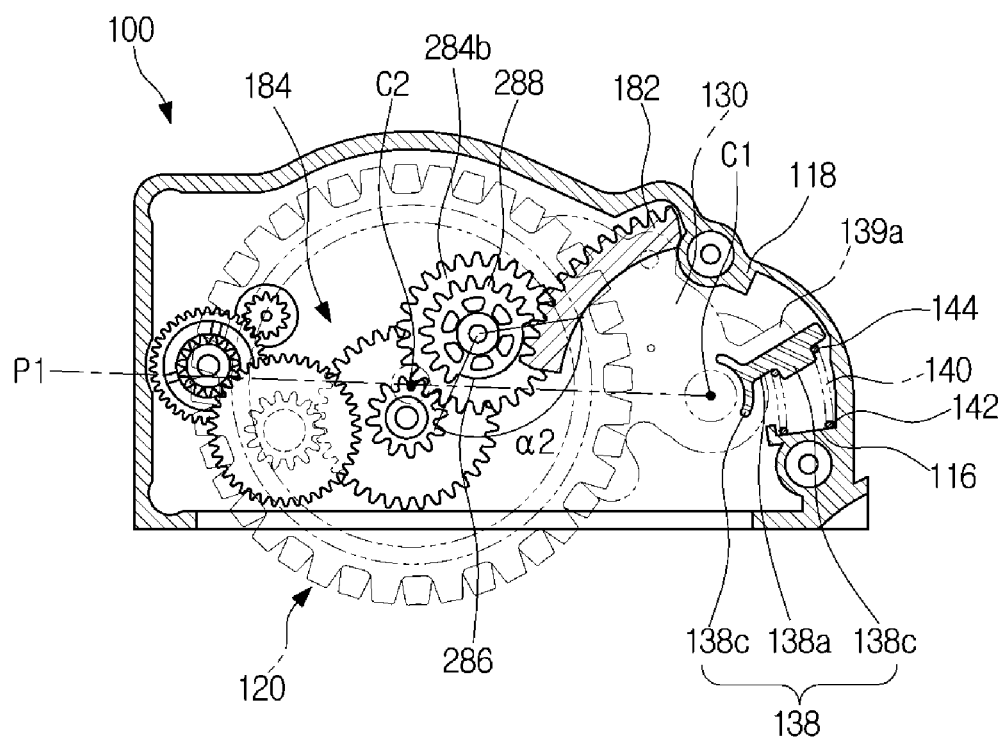
FIGS. 20A to 20C are diagrams illustrating a process of operating the wheel frame driving unit of FIG. 19.
Figure 20B:
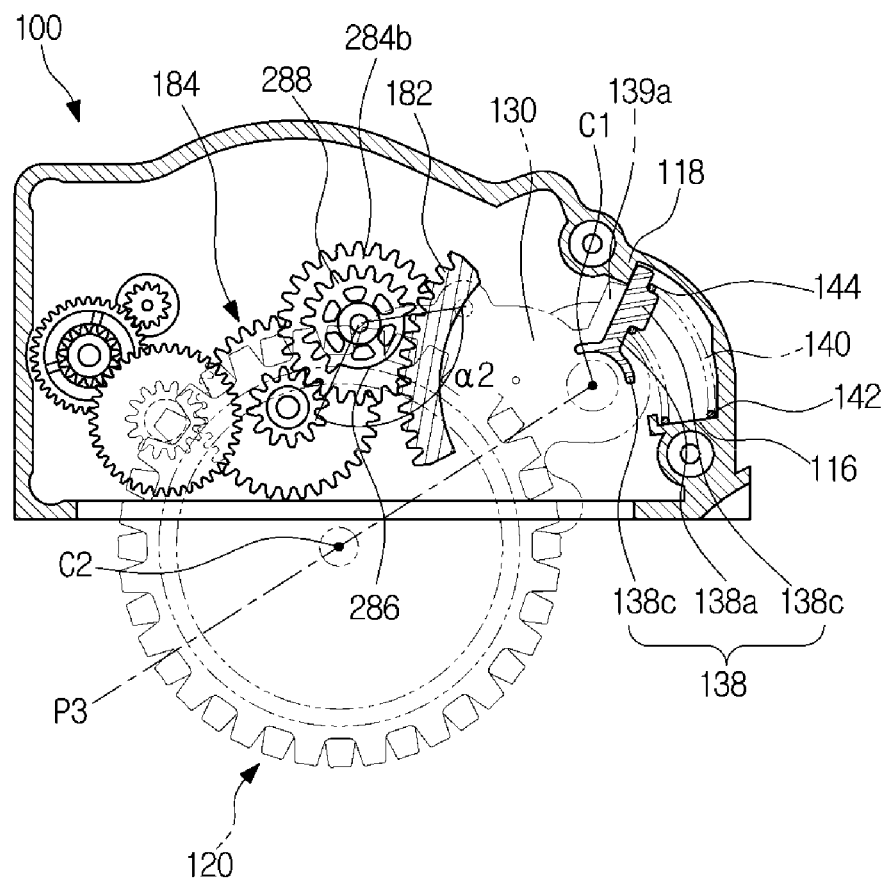
Figure 20C:
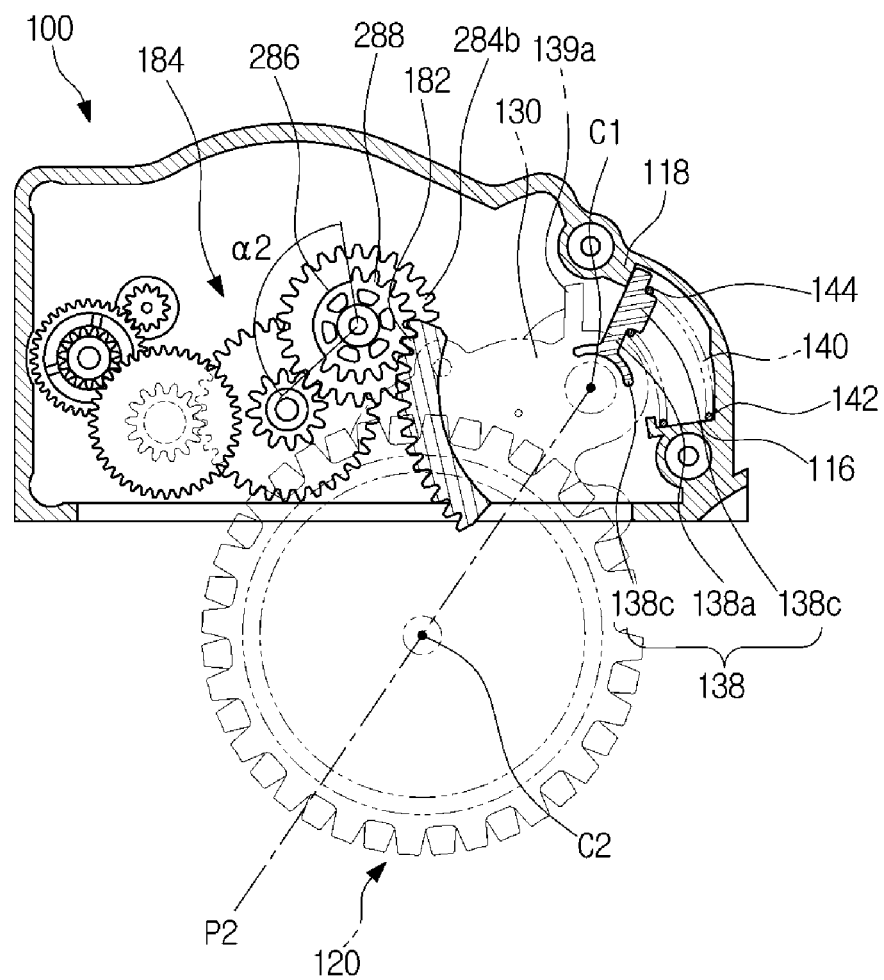

FIG. 19 is a perspective view of a wheel frame driving unit 180 in accordance with a second modified example of the present invention. FIGS. 20A to 20C are diagrams illustrating a process of operating the wheel frame driving unit 180 of FIG. 19.

As illustrated in FIG. 19, a power transfer prevention unit 286 is included in at least one section of a tilt gear 284b to not deliver power between a drive gear 182 and the tilt gear 284b.

The power transfer prevention unit 286 is disposed as a flat circumferential surface on which a gear tooth 288 is not formed to prevent the tilt gear 284b from being engaged with the drive gear 182, and is formed to correspond to an angle α2 between a first position P1 and a third position P3 on a wheel frame 130 in a circumferential direction of the tilt gear 284b.

As illustrated in FIGS. 20A and 20B, the wheel frame 130 rotates between the first position P1 and the third position P3 by pressure applied by the elastic member 140 in a state in which the cleaning robot 1 drives normally. In this case, the drive gear 182 and the tilt gear 284b are not engaged with each other due to the power transfer prevention unit 286. Thus, when the wheel frame 130 rotates by the pressure applied by the elastic member 140, a torque is prevented from being delivered to a second driving motor 160 through the drive gear 282 and the second power transfer gears 184.

As illustrated in FIG. 20B, if the wheel frame 130 is disposed at a third position P3 which is a maximum rotation position by the elastic member 140 when the cleaning robot 1 is in the stuck state, the drive gear 282 and the tilt gear 184b begin to be engaged with each other. Then, when the second driving motor 160 is driven, driving power generated by the second driving motor 160 is delivered to the wheel frame 130 through the tilt gear 184b and the drive gear 282, thereby rotating the wheel frame 130.

Although a few embodiments of the present invention have been shown and described, it would be appreciated by those skilled in the art that changes may be made in these embodiments without departing from the principles and spirit of the invention, the scope of which is defined in the claims and their equivalents.

The invention claimed is:
1. A cleaning robot comprising:
a body; and
a driving unit to drive the body;
wherein the driving unit comprises:
a first driving motor and a second driving motor to generate driving power;
a driving wheel to rotate when the driving power is delivered to the driving wheel from the first driving motor; and a wheel frame to support the driving wheel to be rotatable, and rotate between a first position and a second position with respect to a motor shaft of the first driving motor, wherein the wheel frame rotates in at least one section between the first position and the second position when the driving power is delivered to the wheel frame from the second driving motor.

2. The cleaning robot of claim 1, further comprising:

a housing to fix the first driving motor and the second driving motor; and an elastic member disposed between the housing and the wheel frame, wherein the wheel frame is pressurized by the elastic member to rotate in a section in which the driving power is not delivered to the wheel frame from the second driving motor.

3. The cleaning robot of claim 2, wherein the wheel frame is pressurized by the elastic member to rotate between the first position and a third position between the first position and the second position, and rotates between the third position and the second position when the driving power is delivered to the wheel frame from the second driving motor.

4. The cleaning robot of claim 3, wherein the driving unit comprises:

at least one first power transfer gear contained in the wheel frame to deliver the driving power generated by the first driving motor to the driving wheel; and at least one second power transfer gear disposed between the second driving motor and the wheel frame to deliver the driving power generated by the second driving motor to the wheel frame.

5. The cleaning robot of claim 4, wherein the wheel frame comprises at least one drive gear disposed on an external surface of the wheel frame to receive the driving power from the second power transfer gear.

6. The cleaning robot of claim 5, wherein the at least one drive gear rotates on the motor shaft of the first driving motor.

7. The cleaning robot of claim 5, wherein the at least one drive gear and the second power transfer gear are not engaged with each other when the wheel frame rotates between the first position and the third position.

8. The cleaning robot of claim 1, wherein the motor shaft of the first driving motor and a motor shaft of the second driving motor are parallel to each other.

9. A driving unit installed in a cleaning robot to drive the cleaning robot, the driving unit comprising:

a driving wheel;

a wheel frame to support the driving wheel to be rotatable;

an elastic member to pressurize the wheel frame;

a first driving motor to generate driving power for rotating the driving wheel; and a second driving motor to generate driving power for rotating the wheel frame.

10. The driving unit of claim 9, wherein the elastic member and the second driving motor independently rotate the wheel frame.

11. The driving unit of claim 9, wherein the wheel frame comprises:

a gear storage unit disposed in the wheel frame; and first power transfer gears contained in the gear storage unit to transfer the driving power generated by the first driving motor to the driving wheel.

12. The driving unit of claim 11, further comprising second power transfer gears disposed between the second driving motor and the wheel frame to transfer the driving power generated by the second driving motor to the wheel frame.

13. The driving unit of claim 12, further comprising a support frame to support the second power transfer gears to be rotatable.

14. The driving unit of claim 12, wherein the wheel frame comprises a drive gear disposed on an external surface of the wheel frame to receive the driving power from the second power transfer gears.

15. The driving unit of claim 14, wherein the second power transfer gears comprise:

a motor shaft gear engaged with a motor shaft of the second driving motor;

a tilt gear disposed to be engaged with the drive gear; and at least one connection gear disposed between the motor shaft gear and the tilt gear, to transfer power.

16. The driving unit of claim 15, further comprising a power transfer prevention unit disposed on a circumferential surface of one of the drive gear and the tilt gear to not transfer power between the drive gear and the tilt gear when the wheel frame is pressurized by the elastic member to rotate.

17. The driving unit of claim 14, wherein the drive gear is integrally formed with the wheel frame.

18. The driving unit of claim 9, further comprising a housing to support the first driving motor and the second driving motor.

19. The driving unit of claim 9, wherein the elastic member is disposed at a position opposite the driving wheel with respect to a vertical line passing through a center of rotation of the wheel frame.

20. A cleaning robot comprising:

a body;

a driving unit installed in the body to drive the body, wherein the driving unit comprises:

a driving wheel;

a wheel frame to support the driving wheel to be rotatable; and a driving unit including a driving motor to generate driving power for rotating the wheel frame; and a controller to control the driving unit by determining a driving state of the body, wherein, when it is determined that the body is in a stuck state which prevents the body from driving, the controller drives the driving motor to rotate the wheel frame.

* * * * *